US009544136B2

(12) United States Patent
Yao et al.

(10) Patent No.: US 9,544,136 B2
(45) Date of Patent: *Jan. 10, 2017

(54) KEY AGREEMENT IN WIRELESS NETWORKS WITH ACTIVE ADVERSARIES

(71) Applicants: CALIFORNIA INSTITUTE OF TECHNOLOGY, Pasadena, CA (US); PURDUE RESEARCH FOUNDATION, West Lafayette, IN (US)

(72) Inventors: Hongyi Yao, Pasadena, CA (US); Tracey C. Ho, Pasadena, CA (US); Cristina Nita-Rotaru, Chicago, IL (US)

(73) Assignees: CALIFORNIA INSTITUTE OF TECHNOLOGY, Pasadena, CA (US); PURDUE RESEARCH FOUNDATION, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/150,322

(22) Filed: May 9, 2016

(65) Prior Publication Data
US 2016/0254908 A1 Sep. 1, 2016

Related U.S. Application Data

(63) Continuation of application No. 14/696,304, filed on Apr. 24, 2015, now Pat. No. 9,369,275, which is a continuation of application No. 13/853,881, filed on Mar. 29, 2013, now Pat. No. 9,130,742.

(60) Provisional application No. 61/618,203, filed on Mar. 30, 2012.

(51) Int. Cl.
H04L 29/06 (2006.01)
H04L 9/08 (2006.01)
H04W 12/04 (2009.01)

(52) U.S. Cl.
CPC ........... *H04L 9/0827* (2013.01); *H04L 9/0802* (2013.01); *H04L 9/0838* (2013.01); *H04W 12/04* (2013.01); *H04L 2209/34* (2013.01); *H04L 2209/80* (2013.01)

(58) Field of Classification Search
CPC .. H04L 9/0802; H04L 9/0827; H04L 2209/80; H04L 2209/34
See application file for complete search history.

(56) References Cited

U.S. PATENT DOCUMENTS 6,182,214 B1 * 1/2001 Hardjono ................ H04L 9/085
380/255

OTHER PUBLICATIONS

Pietro et al., "Random Key-Assignment for Secure Wireless Sensor Networks", Published Oct. 2003, SASN '03, pp. 1-9.*

* cited by examiner

*Primary Examiner* — Chau Le
(74) *Attorney, Agent, or Firm* — Steinfl & Bruno, LLP

(57) ABSTRACT

A network and related methods for transmitting processes in a network secretly and securely is described. The network use keys, through path-key establishment and a key pool bootstrapping, to ensure that packets are transmitted and received properly and secretly in the presence of one or more adversarial nodes.

6 Claims, 5 Drawing Sheets

KEY AGREEMENT IN WIRELESS NETWORKS WITH ACTIVE ADVERSARIES

CROSS REFERENCE TO RELATED APPLICATIONS

The present application is a Continuation of U.S. patent application Ser. No. 14/696,304 filed on Apr. 24, 2015 (U.S. Pat. No. 9,369,275 and issued on Jun. 14, 2016), incorporated herein by reference in its entirety, which, in turn, claims priority to U.S. patent application Ser. No. 13/853,881 filed on Mar. 29, 2013 (U.S. Pat. No. 9,130,742 and issued on Sep. 8, 2015), incorporated herein by reference in its entirety, which, in turn, claims priority to U.S. Provisional Application No. 61/618,203 filed on Mar. 30, 2012 and incorporated herein by reference in its entirety.

STATEMENT OF GOVERNMENT GRANT

This invention was made with government support under FA9550-10-1-0166 awarded by the Air Force and CNS0905615 & CNS0905266 awarded by the National Science Foundation. The government has certain rights in the Invention.

FIELD

The present application is directed to information theoretic network error correction codes for networks (e.g. wireless networks).

BACKGROUND

The present disclosure relates to networks and methods related to the field of error correction codes which are covered in various areas such as information theory, coding theory and communication theory, with applications in computer science and telecommunication. In particular, the present disclosure presents a novel construction for error correcting codes with respect to robust distribution of secret keys when one or more subset of nodes within a network are corrupted or untrustworthy.

SUMMARY

According to a first aspect of the present disclosure, a computer-based network with error correction code is provided, the computer-based network configured to transmit keys secretly and securely by: encoding a key on a first single computer-based workstation, forwarding a plurality of encoded files via a plurality of computer-based workstations, and decoding the plurality of encoded files on a second single computer-based workstation using a decoding algorithm to retrieve the key.

According to a second aspect of the present disclosure, a computer-based network with error correction code is provided, the computer-based network configured to transmit a key pool secretly and securely by: dividing a key pool into a plurality of individual keys, forwarding the plurality of individual keys to one or more computer-based workstations within a plurality of computer-based workstations to be encoded such that a particular computer-based workstation within the plurality of computer-based workstations receives one or more of the individual keys of the key pool but less than all of the individual keys of the key pool, encoding, within each computer-based workstation of the plurality of computer-based workstations, received individual keys to be forwarded upon request to a single computer-based workstation, and decoding a plurality of encoded keys on the single computer-based workstation using a decoding algorithm to retrieve a specified subset of the key pool.

According to a third aspect of the present disclosure, a computer-based method for transmitting a key secretly and securely over a network, the network comprising a plurality of computer-based intermediate nodes configured to transmit the key from a computer-based source node to a computer-based receiver node is provided, the method comprising: providing a first computer-based workstation operating as a source node and configured to encode a key and forward, via a first plurality of intermediate transmission links, a distinct encoded file for each intermediate node within a plurality of intermediate nodes of the network, providing a plurality of computer-based workstations operating as intermediate nodes and configured to receive, via the first plurality of intermediate transmission links, the encoded files from the source node and forward, via a second plurality of intermediate transmission links, the encoded files to a receiver node when requested, and providing a second computer-based workstation operating as the receiver node and configured to receive, via the second plurality of intermediate transmission links, encoded files from the plurality of intermediate nodes and decode the encoded files to retrieve the key, wherein a particular intermediate node, with corresponding intermediate transmission links from the first and second plurality of intermediate transmission links, forms a two-hop path between the source node and the receiver node, and wherein one or more of the encoded files received by the receiver node may be erroneous due to an erroneous intermediate transmission link and/or an erroneous intermediate node.

According to a fourth aspect of the present disclosure, a computer-based method for transmitting a key pool secretly and securely over a network, the network comprising a plurality of computer-based intermediate nodes configured to transmit a plurality of individual keys of the key pool to a single computer-based receiver node is described, the method comprising: providing a first plurality of computer-based workstations operating as a plurality of source nodes, each computer-based workstation of the first plurality of computer-based workstations corresponds to an individual key of a key pool and configured to forward the corresponding individual key, via a first plurality of intermediate transmission links, to one or more intermediate nodes within the plurality of intermediate nodes such that a particular intermediate node can have one or more of the individual keys but not all of the individual keys of the key pool, providing a plurality of computer-based workstations operating as a plurality of intermediate nodes, each intermediate node is configured to receive, via the first plurality of intermediate transmission links, one or more of the individual keys but not all of the individual keys of the key pool, to encode the one or more received individual keys of the key pool and to forward, via a second plurality of intermediate transmission links, encoded keys to a receiver node when requested, and providing a computer-based workstation operating as the receiver node and configured to receive, via the second plurality of intermediate transmission links, encoded keys from the plurality of intermediate nodes and decode the encoded keys to retrieve the key pool, wherein one or more of the encoded keys received by the receiver node may be erroneous due to an erroneous intermediate transmission link and/or an erroneous intermediate node.

DETAILED DESCRIPTION

Embodiments of the present disclosure aim to prevent one or more corrupted or untrustworthy intermediate nodes (also referred to as relay nodes) from executing adversarial eavesdropping or corruption attacks in a network (e.g. a distributed wireless network) on key agreement processes. Key agreements are used to set up links between nodes (e.g. source, receiver and intermediate) in a network that are both secure and secret. Such aim is provided by using a method identified as path key establishment whereby a plurality of transmissions are provided over node-disjoint paths in the network to robustly and securely establish a shared key between a source node and a receiver node. In addition, key agreements can utilize another method whereby nodes may acquire some subset of keys from neighboring nodes (aka bootstrapping) in the network to minimize overhead of redundant transmissions from the source node in the network. Both the above methods are described generally in this present disclosure but are more detailed in the enclosed Annex 1, which is part of the present disclosure. Annex 2 is also being included to provide further detail pertaining to the path-key establishment method and therefore also part of the present disclosure.

Path-Key Establishment

As stated above, an aim for key agreement in a wireless network with active adversaries is to ensure that messages, in particular keys, sent by a source node can be transmitted to a receiver node both reliably and secretly. Path key establishment is one method which facilitates the secure and secret transmission of the message between nodes of a network.

Figure 1:
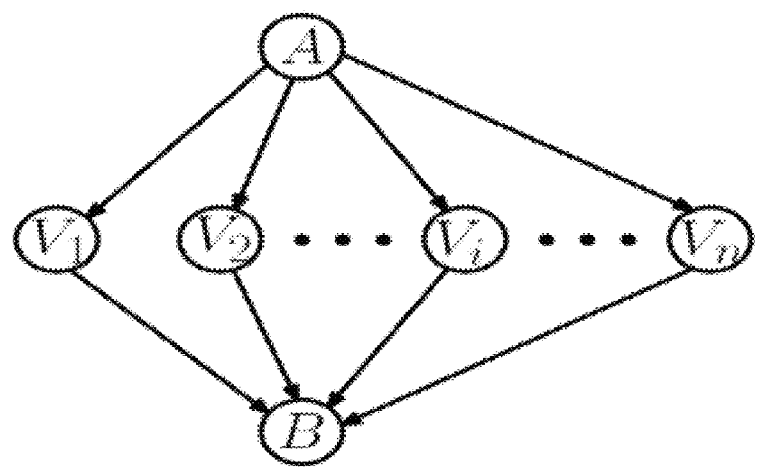
FIG. 1 illustrates a model for path key establishment method.

FIG. 1 illustrates a model for path-key establishment. In particular, the model shows one source node A, one receiver node B and a plurality of intermediate nodes ($V_1, V_2 \ldots V_i \ldots V_n$). Each of the plurality of intermediate nodes ($V_1, V_2 \ldots V_i \ldots V_n$) are connected to the one source node A via a plurality of corresponding input links and are also connected to the one receiver node B via a plurality of corresponding output links thereby creating a plurality of two-hop paths (multi-hop network) between the source node A and the receiver node B.

With the path key establishment method, the source node A and receiver node B desire to establish a secure channel without the use of a priori shared secret key. To achieve such a condition, the source node A and receiver node B establish a secret key by communicating over existing secure channels in the multi-hop network. Further detailed explanation pertaining to the benefits of this first method over the prior use of shared secret keys is provided in Section I ('Introduction') of Annex 1 and Section 1 ('Introduction') of Annex 2.

An assumption used within the embodiment of the present disclosure is that a number of compromised nodes (z) within the plurality of intermediate nodes ($V_1, V_2 \ldots V_i \ldots V_n$) would need to be less than or equal to a lower bound wherein the lower bound is related to a number of available intermediate nodes (n) within the network. If such a condition is present in the network, the source node A could transmit to receiver node B secretly and securely. If such a condition is not present in the network (i.e. if the number of compromised nodes (z) within the plurality of intermediate nodes ($V_1, V_2 \ldots V_i \ldots V_n$) is greater than the lower bound), then the source node A may not be able to transmit reliably and securely to the receiver node B. Further detail pertaining to the conditions for transmissions is provided under section II ('Path-Key Establishment), Theorem 1 of Annex 1.

With respect to the prior art, the source node A could include hash checks with a plurality of message parts transmitted to the plurality of intermediate nodes ($V_1, V_2 \ldots V_i \ldots V_n$). Such hash checks (a form of error detection) would be received by the receiver node B to ensure that a particular message part is correct. However, such implementation does not ensure the secrecy and security of the plurality of message parts sent through the network. Further detail is provided under section II, Theorem 1 of Annex 1 and section 4.2 ('Coding Technique') of Annex 2.

Figure 2:
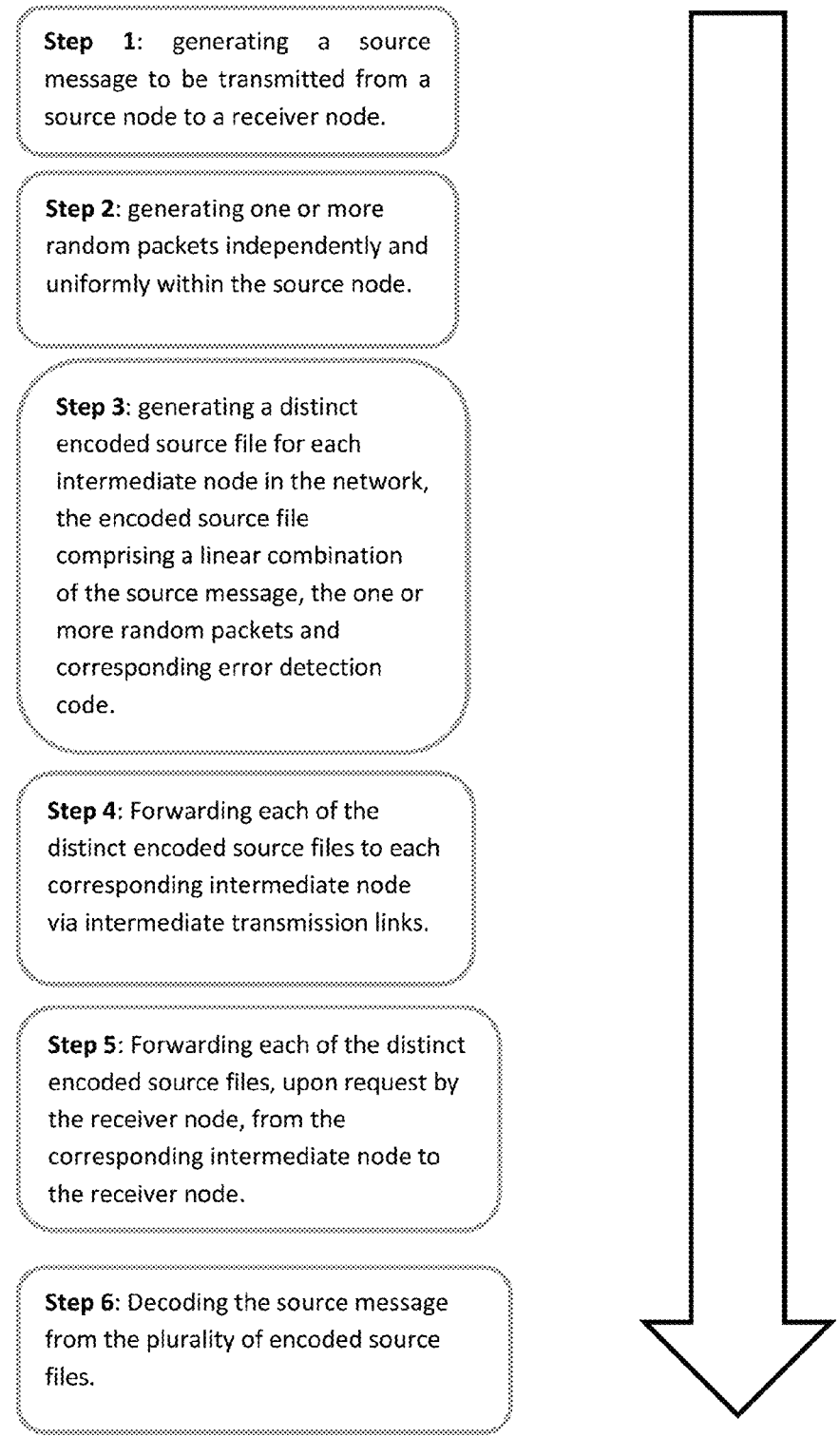
FIG. 2 illustrates a flowchart detailing the path key establishment.

Reference now turns to FIG. 2 which provides an overview of the path key establishment (see, steps 1-6 of FIG. 2). With an embodiment of the present disclosure, the above lack of secrecy and security is resolved through the use of keys being generated and transmitted. The source node A independently and uniformly generates one or more random packets to be linearly combined with each of the plurality of message parts (comprising the keys) and hash checks (error detection code). The linear combination of the random packets, message parts and hack checks form a plurality of packets to be transmitted to the plurality of intermediate nodes. Further detail pertaining to the operation of the source node A is provided in section II, sub-section C ('Our Construction for Secrecy and Error Correction—Encoder at node A') of Annex 1 and section 4.2, Encoder at node A, of Annex 2.

With respect to the receiver node B, the plurality of packets to be transmitted from the source node A are received at the receiver node B after being requested from the plurality of intermediate nodes. Much like the prior art, the hash checks are used to provide error detection to ensure that a particular message part was transmitted correctly. However, with the addition of the independently and uniformly generated random packets that are linearly combined with the plurality of message parts, receiver node B can be sure that the message parts are secret under certain conditions. Further detail pertaining to the operation of the receiver node B is provided in section II, sub-section C ('Our Construction for Secrecy and Error Correction—'Decoder at node B') of Annex 1 and section 4.2, Decoder at node B, of Annex 2. Additional information pertaining to how the use of keys ensures security and secrecy is provided under section II, Theorem 2 of Annex 1 and section 4.2, Theorem 4.2 of Annex 2.

The above disclosure details an embodiment of the network where the source node A generates, encodes and forwards the key to be received by the receiver node B. In the following section, a different method for establishing secret keys, referred to as key pool bootstrapping, is described.

Key Pool Bootstrapping

A general overview of the method of key pool bootstrapping is provided below. Detailed descriptions of the method are provided in Section III ('Key Pool Bootstrapping') of Annex 1. In particular, the method of key pool bootstrapping pertains to a recursive transmission of a subset of keys belonging to a key pool which was generated by a key center.

Figure 3A:
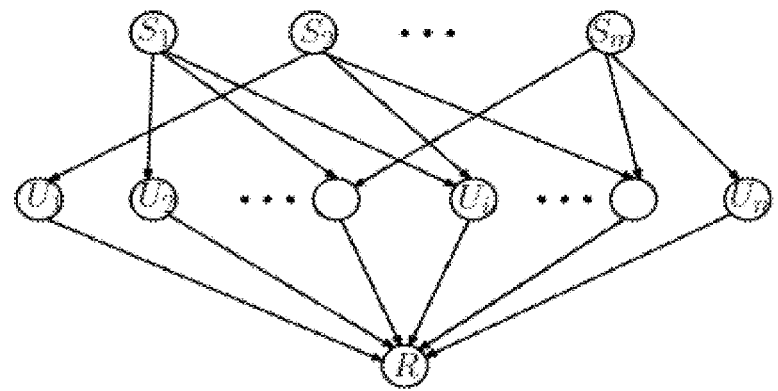
FIGS. 3A-3D illustrate examples of key pool bootstrapping.

Reference is made now to FIG. 3A illustrating a network model for key pool bootstrapping. The key pool, as stated above, is generated by a key center. To ensure that no intermediate node (identified as nodes $U_1 \ldots U_n$) possesses the entire key pool, thereby ensuring security from potential adversary nodes, each of these intermediate nodes receives a subset of the keys from the key pool. Further detail is provided under section III, sub-section A ('Problem Formulation') of Annex 1.

As shown in FIG. 3A, all of the intermediate nodes receive a subset of keys directly from the key center. However, in another embodiment not shown in FIG. 3A, it is possible that only some of the intermediate nodes receive keys directly from the key center. The rest of the intermediate nodes would be configured to receive keys from the intermediate nodes that have previously received their keys. FIG. 3A does not illustrate the presence of the intermediate nodes which would obtain their keys from other intermediate nodes and corresponding lateral links between the two sets of intermediate nodes (e.g. those intermediate nodes with keys and those that request keys). However, the method whereby the intermediate nodes acquire keys from other intermediate nodes is similar to the method by which the receiver node (R) of FIG. 3A acquires the key pool from all intermediate nodes ($U_1 \ldots U_n$) described below.

Figure 3B:
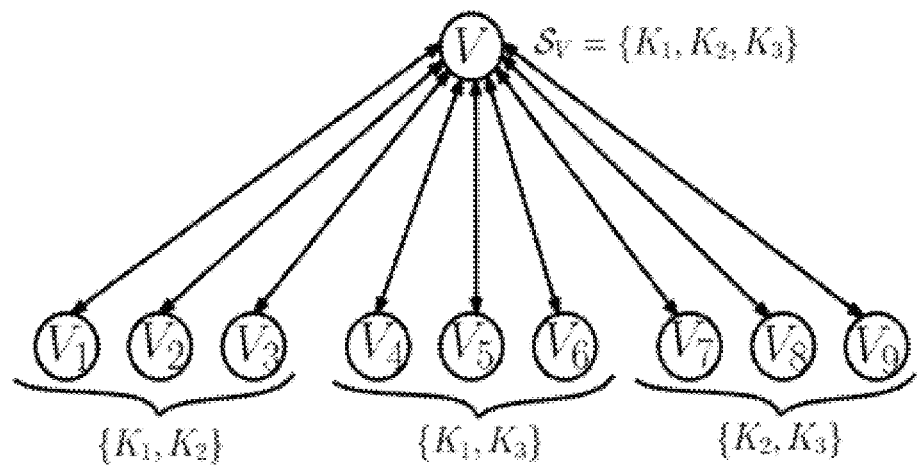

With respect to the receiver node (R) in FIG. 3A, such node acquires its keys in a recursive manner from intermediate nodes ($U_1 \ldots U_n$) that received their own subset of keys from the key center. FIG. 3B illustrates an overview of key pool bootstrapping whereby a receiver node (V) acquires a specific set of keys (indicated as a set of keys $K_1$, $K_2$ and $K_3$) from a plurality of intermediate nodes ($V_1 \ldots V_9$) each containing a subset of the key pool (e.g. $K_1$ and $K_2$ only). Further detail is provided under section III, sub-section B ('Connection between Multi-source Network Error correction Coding and Key Pool Bootstrapping') and sub-section C ('Multi-source Network Error correction Codes for Key Pool Bootstrapping') of Annex 1.

Figure 3C:
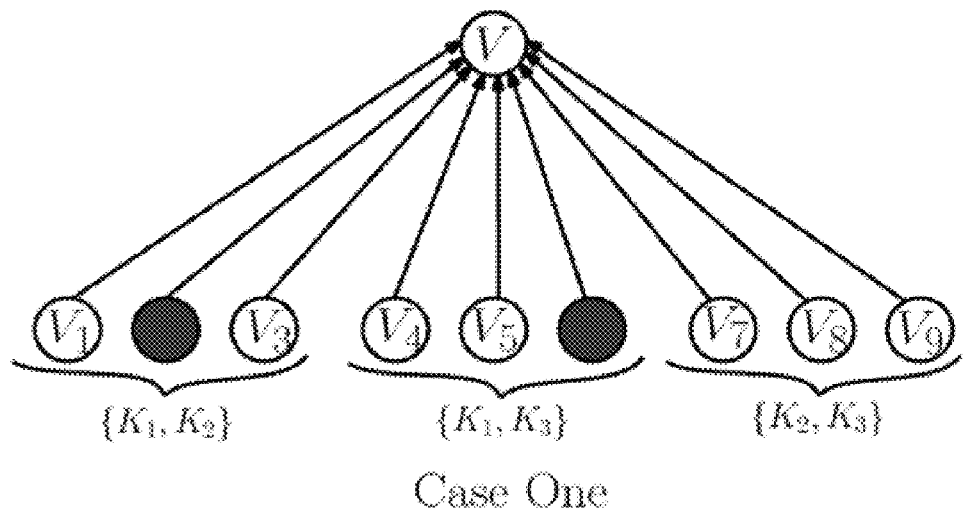
Figure 3D:
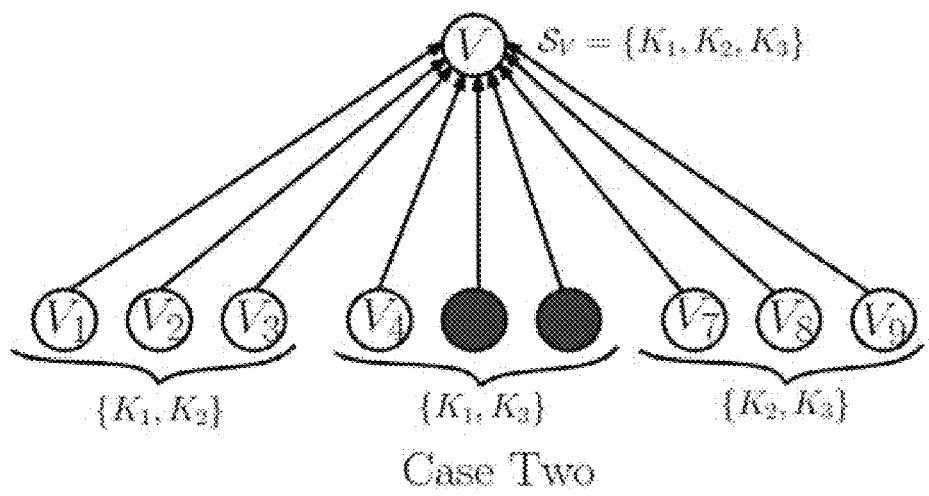

FIGS. 3C and 3D illustrate examples where one or more intermediate nodes being accessed by the receiver node (V) are compromised (indicated by a filled blacked node). However, in such a situation, even if the identities of compromised nodes are unknown it is still possible that the subset of keys can still be retrieved based on the combined information received from the other non-compromised intermediate nodes, through the application of network error correction coding, which also provides a characterization of the number of compromised nodes that can be tolerated given the total number of nodes and the subsets of keys that they hold. Additional information relating to error correction for key pool bootstrapping is provided under section III, sub-section C of Annex 1.

Figure 4:
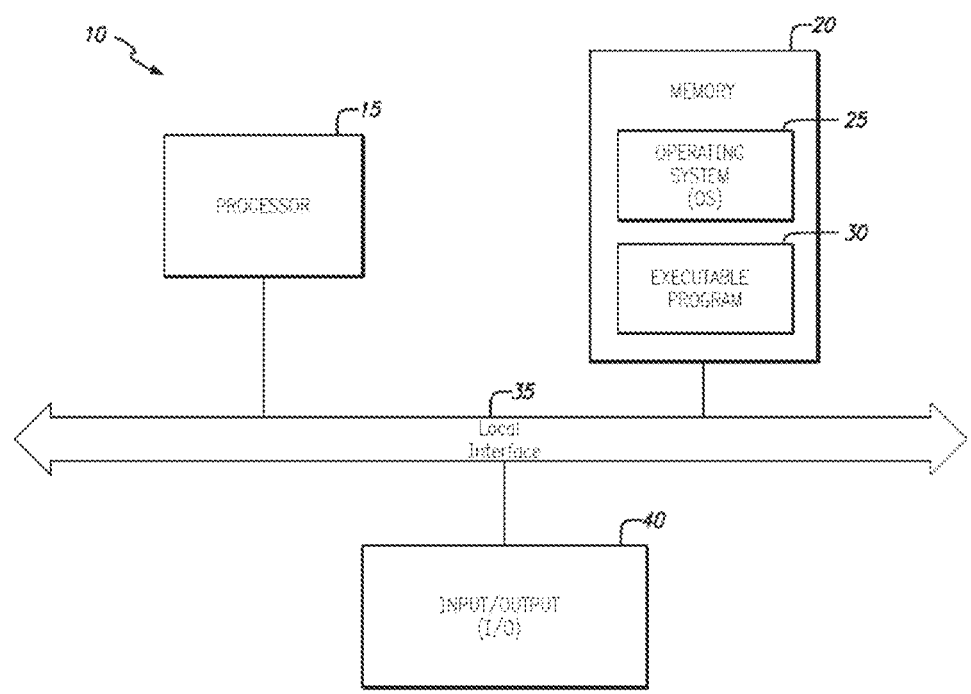
FIG. 4 illustrates a system that may be used to implement the key agreement methods of the present invention

FIG. 4 is an exemplary embodiment of a system (10) (e.g. a computer system, workstation) for implementing the key agreement methods described above. In particular, the system can be implemented in one or more of the plurality of nodes (i.e. source, receiver and/or intermediate) of the networks described above. The system, as seen in FIG. 4, comprise a processor (15), memory (20), a local interface (35) and one or more input and/or output (I/O) devices (40). The processor (15) may execute one or more instructions related to the implementation of the key agreement methods described above and as provided by the operating system (OS) (25) based on some executable program stored in the memory (20). These instructions are carried to the processors (20) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, outputting data to a display, or outputting data to a USB flash drive. In some embodiments, the operating system (25) facilitates these tasks by being the central element to gather the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 4. In some embodiments, a plurality of processors may be used in a parallel configuration for added execution speed. In such a case, the executable program may be specifically tailored to a parallel execution. Also, in some embodiments the processor (15) may execute part of the key agreement methods described above and some other parts may be implemented using dedicated hardware/firmware placed at an I/O location accessible by the system (10) via a local interface (35). The system (10) may include a plurality of executable programs (30), wherein each may run independently or in combination with one another.

The examples set forth above are provided to give those of ordinary skill in the art a complete disclosure and description of methods pertaining to key agreement for wireless networks with active adversaries, and are not intended to limit the scope of what the inventors regard as their disclosure. The skilled person may find other suitable implementations of the presented embodiments.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications can be made without departing from the spirit and scope of the present disclosure. Accordingly, other embodiments are within the scope of the following claims.

ANNEX 1

Coding against errors in key distribution

Inventors: Hongyi Yao, Tracey Ho and Cristina Nita-Rotaru

This disclosure concerns the application of error correcting codes for robust distribution of secret keys. This is useful to bootstrap secure communication in a sensor/ad hoc network. A key pre-distribution scheme is used to set up secure links between some pairs of nodes. These secure links form an overlay network, which is used for further key distribution among nodes to set up additional secure links. Error correction coding is used to provide robustness against an unknown subset of nodes being corrupted or untrustworthy. Compared with cryptographic approaches, schemes based on information theoretic error correction codes have lower computational overhead and do not make computational assumptions about the adversary.

The attached paper describes in detail the application of network error correction codes in two scenarios. In the first scenario, a secure network error correction code is applied over node-disjoint paths between two nodes A and B in the overlay network, allowing A and B to robustly and securely establish a shared key. In the second scenario, each node in the network holds a subset of keys from a key pool. A node that needs some subset of keys can obtain them from neighbors on the overlay network that already have those keys. Robustness is obtained by contacting multiple neighbors, and distributed error correction coding is used to minimize the overhead of redundant transmissions.

Key Agreement for Wireless Networks in the Presence of Active Adversaries

Hongyi Yao[1], Tracey Ho[1] and Cristina Nita-Rotaru[2]
[1]California Institute of Technology, [2]Purdue University

*Abstract*—In this work we consider key agreement in a distributed wireless network in which adversarial nodes may exist in the network. Two practical scenarios are studied, i.e., path-key establishment and key pool bootstrapping. For both scenarios, previous work mainly focuses on preventing adversarial eavesdropping attacks. When the adversarial nodes can both eavesdrop and change the packets in the network, we show that an optimal scheme (in terms of error correction capability) can be obtained by using techniques from the literature of network error correction codes. In particular, for the path-key establishment problem, which has a particular topological structure, we propose a lightweight scheme with lower error probability and computational complexity than existing network error correction codes. For the key pool bootstrapping scenario, we show a connection with multisource network error correction coding, and show that network coding is necessary for optimal resilience against adversarial attacks.

I. INTRODUCTION

In this paper we consider key agreement protocols for wireless networks in which several nodes are compromised by an adversary. We assume active attacks, in which the compromised nodes are able to transmit fake packets to disrupt the key agreement process.

The contribution of this paper is showing that information theoretic network error correction codes [2][6] can be applied to achieve optimal performance for two practical key agreement scenarios. Compared with cryptographic authentication, schemes based on information-theoretic error correction codes do not need pre-key set up, achieve low computational overhead, and are secure even when the adversary has unlimited computational capability.

Two scenarios are considered. In the first scenario, path-key establishment [3], we consider a multihop wireless network. In such network, two nodes, $A$ and $B$, want to set up multi-hop secure communications, without an *a priori* shared secret key. To establish the secure channel, nodes $A$ and $B$ need to communicate over the multi-hop wireless network to establish a secret key. We assume a pre-distribution scheme [1] exists, such that each pair of nodes share a secret key with some probability. In this scenario, each node which shares secret keys with both $A$ and $B$ in fact sets up a logical two-hop path between $A$ and $B$. Thus, the problem of key agreement between $A$ and $B$ can be reduced to the problem of secure communication in a two-hop parallel path network. When some of the wireless nodes can be compromised by an adversary, the work in [6] shows the maximum rate at which the source can transmit secretly and securely when using network error correction codes. We propose a new code which achieves the same rate, but, being designed for a specific topology, achieves better performance, i.e. lower computational complexity and probability of error. The new scheme is an extension of [4] which only considers error correction but not the secrecy of the messages.

In the second scenario, key pool bootstrapping, there is a set of keys (key pool), $\mathcal{K}$, generated by a key center. Each network node, say $V$, needs a subset of keys from $\mathcal{K}$. Rather than each node having to communicate directly with the key center, nodes in the network set up keys in a recursive manner. In particular, each node $V$ retrieves the desired keys from its neighbors who are closer to the key center and have already retrieved their keys in previous stages. When several neighbors of $V$ are compromised by an adversary, we show that multisource network error correction codes [2] are able to achieve the maximum secure rate. An interesting observation is that network coding is necessary for optimal resilience against such active adversarial attacks.

II. PATH-KEY ESTABLISHMENT

A. Problem Formulation

Let $F_q$ be a finite field with size $q$. We assume that a key pre-distribution scheme [1] exists, such that each

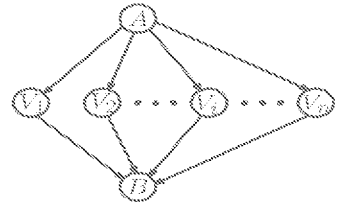

Fig. 1. Logical two-hop model for path-key establishment.

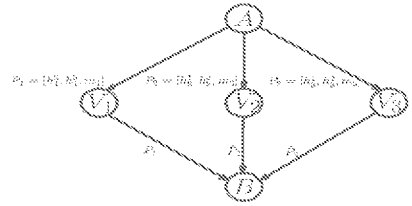

Fig. 2. Illustrating example for the scheme in [4].

pair of nodes shares a secret key with some probability.

For a pair of nodes $A$ and $B$ who want to set up secure communications but do not share any secret key in the pre-distribution scheme, a path-key establishment protocol allows them to establish a secret key in a multi-hop fashion. Specifically, it allows $A$ to transmit a secret key $K \in \mathbb{F}_q^k$ to node $B$ with the help of the logical one-hop keys established with the key pre-distribution scheme. Let $\mathcal{V} = \{V_1, V_2, \ldots, V_n\}$ be the set of nodes which share secret keys with both $A$ and $B$. Thus, each node in $\mathcal{V}$ has a secure secure one-hop link to both $A$ and $B$. As shown in Figure 1, the nodes in $\mathcal{V}$ set up $n$ logical two-hop parallel paths between $A$ and $B$. Let $C$ symbols in $\mathbb{F}_q$ be transmitted over each path.

We assume $z$ nodes in $\mathcal{V}$ are compromised by an adversary, who can both eavesdrop on the packet and change the packet contents arbitrarily so as to disrupt the key establishment protocol. Paths through the non-compromised nodes are secure.

*B. Background*

Our scheme builds on two previous results. The network error correction code [6] gives the maximum rate at which the source can transmit secretly and securely; our construction achieves the same maximum rate but with a lower computational complexity and a higher error correction probability. Our new scheme is an extension of that in [4] which only considers error correction but not the secrecy of the messages.

Directly applying the result in [6], which provides polynomial time encoding and decoding algorithms for all achievable rates, gives the following:

Theorem 1. *For the path-key establishment problem above,*

- *If $z \leq \lfloor (n-1)/2 \rfloor$, there exists exists polynomial time scheme such that $A$ can transmit $K$ to $B$ secretly and correctly. The computational complexity is $O(C \log(n) M(n))$, where $M(n)$ is the matrix multiplication complexity for dimensions $n \times n$. In particular, the adversary can get zero information*

*about $K$, and the probability that $B$ cannot decode $K$ is $O(\exp(n)C/q)$.*

- *Else if $z > \lfloor (n-1)/2 \rfloor$, for any $k$ and $C$, with a probability 1 node $A$ cannot transmit $K$ to $B$ for any scheme.*

We overview the scheme in [4] with an example where there are three nodes and one malicious node, $n = 3$ and $z = 1$, as shown in Figure 2. Node $A$ constructs three packets $P_1$, $P_2$ and $P_3$, to deliver along $V_1$, $V_2$ and $V_3$ respectively. In particular, $P_i$ is constructed as $[h_i^j, h_i^k, m_i]$, where $m_i$ is the message part, $j \neq k$, $j \neq i$ (and $k \neq i$) and $h_i^j$ (and $h_i^k$) is a hash check for the message part in packet $P_j$ (and $P_k$).

Upon receiving the three packets $\{\tilde{P}_1, \tilde{P}_2, \tilde{P}_3\}$, node $B$ decodes as follows. For the message part of each received packet, say $\tilde{m}_i$, node $B$ checks how many hash checks in other packets agree with $\tilde{m}_i$. If there exists at least one hash check that agrees with $\tilde{m}_i$, node $B$ accepts $\tilde{m}_i$ as the correct message $m_i$; otherwise, $\tilde{m}_i$ is taken to be erroneous.

The scheme does not consider the secrecy of the message. For instance, assume node $V_2$ is compromised. Then both the message part $m_2$ and the hash checks $h_2^1, h_2^3$ would leak information about the secret key.

*C. Our Construction for Secrecy and Error Correction*

In this subsection, the complete construction is provided for the path-key establishment problem defined in II-A. In the following, we use $z_m$ to denote $\lfloor (n-1)/2 \rfloor$.

Encoder at node $A$.

- Let $K \in \mathbb{F}_q^k$ denote the key that is desired to be transmitted from $A$ to $B$.
- Node $A$ independently and uniformly generates $z_m$ random packets $\mathcal{R} = \{R_1, R_2, \ldots, R_{z_m}\}$ over $\mathbb{F}_q^k$.
- Node $A$ independently and uniformly generates $n$ random packets $\mathcal{D} = \{D_1, D_2, \ldots, D_n\}$ over $\mathbb{F}_q^{2m}$.
- As shown in Figure 3, node $A$ constructs $n$ packets $\mathcal{P} = \{P_1, P_2, \ldots, P_n\}$, each of which is delivered through one of $\mathcal{V} = \{V_1, V_2, \ldots, V_n\}$.

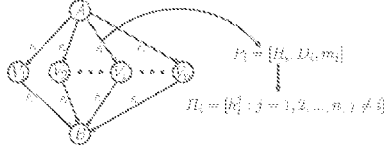

Fig. 3. Coding construction at node $A$.

- Packet $P_i$ is constructed as $P_i = [H_i, D_i, m_i]$, as shown in Figure 3.
  - Message $m_i \in \mathbb{F}_q^k$ is a linear combination of $K$ and the packets in $\mathcal{R}$, i.e., $m_i = \sum_{\ell=1}^{z_m}(c_i)^\ell R_\ell + (c_i)^{z_m+1} K$. We assume $c_1, c_2, \ldots, c_n$ are distinct and publicly known.
  - As shown in Figure 3, hash $H_i$ is constructed as $H_i = \{h_i^j : j = 1, 2, \ldots, n, j \neq i\}$. Hash $h_i^j \in \mathbb{F}_q^2$ is defined as $h_i^j = [\alpha_i^j, v_i^j]$, where $\alpha_i^j$ is independently and uniformly chosen from $\mathbb{F}_q$ and $v_i^j$ is the linear product between $[D_j, m_j]$ and vector $[(\alpha_i^j)^1, (\alpha_i^j)^2, \ldots, (\alpha_i^j)^{z_m+k}]$.

Each intermediate node $V_i$ in $\mathcal{V}$ directly forwards $P_i$ to node $B$.

Decoder at node $B$.

- From node $V_i$, node $B$ receives packet $\tilde{P}_i = [\tilde{H}_i, \tilde{D}_i, \tilde{m}_i]$. For message $\tilde{m}_i$, node $B$ checks whether hash $\tilde{h}_j^i = [\tilde{\alpha}_j^i, \tilde{v}_j^i]$ agrees with $\tilde{m}_i$, for each $j \neq i$.
  - Message $\tilde{m}_i$ is said to agree with $\tilde{h}_j^i$ if and only if $\tilde{v}_j^i$ is equal to the inner product of $[\tilde{D}_i, \tilde{m}_i]$ and vector $[(\tilde{\alpha}_j^i)^1, (\tilde{\alpha}_j^i)^2, \ldots, (\tilde{\alpha}_j^i)^{z_m+k}]$.
- Message $\tilde{m}_i$ is accepted as a valid message if and only if there are at least $z_m$ hashes that agree with it. If there are more than $z_m + 1$ valid messages, node $B$ has $z_m + 1$ random linear combinations of $K$ and $\mathcal{R}$. If they are all linear independent, node $B$ can decode $K$ by Gaussian Elimination.

In the next subsection, we prove that when the number of compromised nodes $z$ is no larger than $z_m$, with high probability node $B$ can decode $K$.

D. Theoretical Analysis

For the codes constructed above, we have the following theorem.

Theorem 2. *When $z \leq z_m$, the adversary gets zero information about the key $K$, and node $B$ can decode $K$ with a probability at least $1 - O(n^2 C/q)$. The encoding and decoding complexity is $O(C \cdot M(n))$, where $M(n)$ is the complexity of matrix multiplication for dimensions $n \times n$.*

*Proof:* We first prove the secrecy. Without loss of generality, we assume $z = z_m$, nodes $V_1, \ldots, V_{z_m}$ are compromised and therefore packets $P_1, P_2, \ldots, P_{z_m}$ are eavesdropped. For any $j > z_m$, if $\alpha_1^j, \alpha_2^j, \ldots, \alpha_{z_m}^j$ are not distinct, the information in $h_1^j, h_2^j, \ldots, h_{z_m}^j$ is redundant. Thus, we can assume $\alpha_1^j, \alpha_2^j, \ldots, \alpha_{z_m}^j$ are distinct, which only strengthen the eavesdropping capability of the adversary.

To prove the secrecy, it is sufficient to prove that for any $K' \in \mathbb{F}_q^k$, there exists exactly one possible value of $(D, \mathcal{R})$ resulting in the adversarial observation $\{P_1, P_2, \ldots, P_{z_m}\}$. For any $K' \in \mathbb{F}_q^k$, to result in $\{m_1, m_2, \ldots, m_{z_m}\}$, the $z_m$ vectors in $\mathcal{R}$ needs to satisfy $z_m$ linear vector equations. Since $c_1, c_2, \ldots, c_{z_m}$ are distinct, due to the property of Vandermonde matrix, such $z_m$ linear vector equations are independent. Thus, there is exactly one possible sample of $\mathcal{R}$.

For each $j > z_m$, to agree with $\{h_1^j, h_2^j, \ldots, h_{z_m}^j\}$, the $z_m$ elements in $D_j$ needs to satisfy $z_m$ linear equations. Since $\alpha_1^j, \alpha_2^j, \ldots, \alpha_{z_m}^j$ are distinct, due to the property of Vandermonde matrix, such $z_m$ linear equations are independent. Thus, there is exactly one possible sample of $D_j$.

Thus, we complete the proof of secrecy. In the following we prove that node $B$ can decode key $K$ with probability $1 - O(nC/q)$. Since $n \geq 2z_m + 1$, for any valid received packet $\tilde{P}_i = [\tilde{H}_i, \tilde{D}_i, \tilde{m}_i] = P_i$, there are at least $z_m$ hashes from other received packets that agree with $\tilde{m}_i$. For any corrupted packet $\tilde{P}_i = [\tilde{H}_i, \tilde{D}_i, \tilde{m}_i]$, if $[\tilde{D}_i, \tilde{m}_i] \neq [D_i, m_i]$, in the following we compute the probability that the hash of a valid packet agrees with $\tilde{m}_i$. Assume $\tilde{P}_j = P_j$ is valid, since the adversary has no information about $\alpha_j^i$, the probability that it can forge $[\tilde{D}_i, \tilde{m}_i]$ to agree with $h_j^i$ is no more than $O(C/q)$. Using union bound [5], the probability is no more than $O(nC/q)$ that $[\tilde{D}_i, \tilde{m}_i]$ agrees with the hash of a valid packet.

Also using the union bound [5], the probability is no more than $O(n^2 C/q)$ that node $B$ will accept a corrupted message $\tilde{m}_i$. Thus, with the at least $z_m + 1$ valid messages, node $B$ can decode $K$ by solving $z_m + 1$ linear vector equations. Since any $z_m + 1$ of $c_1, c_2, \ldots, c_n$ are distinct, due to the property of Vandermonde matrix, such $z_m + 1$ linear vector equations are independent. Thus, node $B$ can decode $K$ correctly.

For node $A$, the computational complexity of constructing each $P_i$ is $O(nC)$. Thus the total complexity of $A$ is $O(n^2 C)$. For node $B$, the computational complexity of checking each $\tilde{P}_i$ is $O(nC)$. Thus the total complexity of checking is $O(n^2 C)$. Since, the complexity of linear decoding $K$ from the valid messages is $O(M(n)C)$, the total complexity of $B$ is $O(M(n)C)$.

III. KEY POOL BOOTSTRAPPING

In this section, we apply the theoretical multi-source network error correction codes [2] to the practical key pool bootstrapping problem [1].

A. Problem Formulation

Let $S = \{K_1, K_2, ...\}$ be a set of keys generated by a key center, each of which is a vector in $\mathbb{F}_q^k$. Each wireless node $V$ desires a subset $S_V = \{K_{v_1}, K_{v_2}, ..., K_{v_m}\}$ of keys from $S$. Rather than every node communicating directly with the key center, nodes in the network set up keys in a recursive manner. For instance, node $V$ obtains the desired keys from neighbours who are closer to the key center and have already obtained their keys in previous stages.

Let $\mathcal{V} = \{V_1, ..., V_n\}$ be the set of the neighbours of $V$, each of which has a subset of $S_V$. For instance, in Figure 5, node $V$ wants to recover keys $\{K_1, K_2, K_3\}$ from its neighbours $\{V_1, ..., V_9\}$, each of which has a subset of $\{K_1, K_2, K_3\}$.

We assume the links between $V$ and its neighbours are secure, and a communication constraint whereby each neighbour node is able to transmit a vector in $\mathbb{F}_q^k$ to $V$.

We assume a subset of $z$ neighbours are compromised by an omniscient adversary, who can transmit arbitrarily corrupted packets from the compromised nodes, and knows every packet transmitted by the other neighbours.

B. Connection between Multi-source Network Error Correction Coding and Key Pool Bootstrapping In the following, we show a connection between the multi-source network error correction problem solved in [2] and the key pool bootstrapping problem defined above.

Consider a key-pool bootstrapping instance, in which node $V$ wants to recover the keys in $S_V = \{K_{v_1}, K_{v_2}, ..., K_{v_m}\}$. Nodes in $\mathcal{V} = \{V_1, V_2, ..., V_n\}$ are neighbours of $V$ and each maintains a subset of $S_V$. We construct the equivalent two-hop multi-source network shown in Figure 4. In the network, node $R$ is the receiver, there are $m$ sources $\{S_1, S_2, ..., S_m\}$ and $S_i$ has message $K_{v_i}$. Nodes in $\{U_1, U_2, ..., U_n\}$ form the intermediate layer. Each of the intermediate nodes has a link to the receiver $R$, which can transmit a packet in $\mathbb{F}_q^k$. For any $i$ and $j$, if $V_i$ in the key pool bootstrapping instance has key $K_{v_j}$, node $U_i$ in Figure 4 has a reliable link with infinite capacity from source $S_j$.

If there is a error correction coding solution for the network in Figure 4, the nodes in $\mathcal{V}$ can emulate the solution to bootstrap $S_V$ at $V$. On the other hand, if there

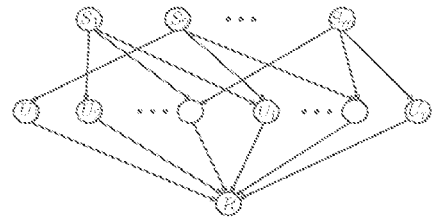

Fig. 4. An equivalent multi-source multicast network model for key pool bootstrapping.

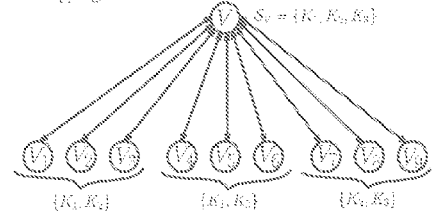

Fig. 5. The illustrating example key-pool bootstrapping.

is a solution for the key-pool bootstrapping instance, the sources in Figure 4 can forwarded their messages to the corresponding intermediate nodes allowing them to emulate the key-pool bootstrapping solution.

From [2], we have the following theorem for the key-pool bootstrapping problem.

Theorem 3. *Node $V$ can decode $S_V = \{K_{v_1}, K_{v_2}, ..., K_{v_m}\}$ in the presence of $z$ compromised nodes if and only if for each non-empty subset $\mathcal{L}$ of $\{1, 2, ..., m\}$,*

$$|\mathcal{L}| \leq |\mathcal{V}_\mathcal{L}| - 2z,$$

*where $\mathcal{V}_\mathcal{L} \subseteq \mathcal{V}$ contains each node in $\mathcal{V}$ that has at least one component in $\{K_{v_j}, j \in \mathcal{L}\}$.*

C. Multi-source Network Error Correction Codes for Key Pool Bootstrapping

We consider the illustrating example shown in Figure 5. Node $V$ wants to recover $\{K_1, K_2, K_3\}$ from its neighbours $\{V_1, V_2, ..., V_9\}$, each of which maintains a subset of $\{K_1, K_2, K_3\}$. In particular, nodes in group $G_1 = \{V_1, V_2, V_3\}$ have $\{K_1, K_2\}$, nodes in group $G_2 = \{V_4, V_5, V_6\}$ have $\{K_1, K_3\}$ and nodes in group $G_3 = \{V_7, V_8, V_9\}$ have $\{K_2, K_3\}$. In the following, we show that network codes can achieve strictly better error correction performance than conventional error correction codes where there is no coding across different keys $K_i$.

Conventional error correction codes
In a conventional error correction code, separate capacity

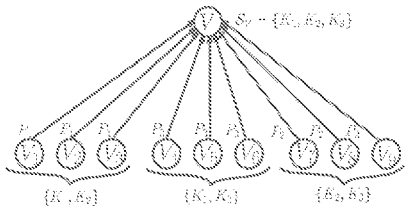

Fig. 6. Conventional error correction codes.

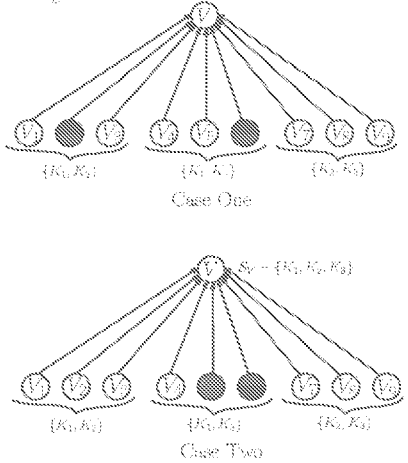

Fig. 7. There are two possible cases when two nodes are compromised by the adversary.

is allocated for transmission of each key. As shown in Figure 6, nodes in groups $G_1$, $G_2$ and $G_3$ use majority coding to transmit keys $K_1$, $K_2$ and $K_3$, respectively. Thus, if there is only one compromised node, node $V$ can recover $\{K_1, K_2, K_3\}$ correctly.

With two compromised nodes, there are two cases as shown in Figure 7. In case one, the two compromised nodes are in different groups. Therefore node $V$ can still recover $\{K_1, K_2, K_3\}$ by majority decoding. However, in case two, the two compromised nodes are in the same group $G_2$, and thus can forge the same erroneous key value $K'_2$. In such case, node $V$ cannot decode $K_2$ correctly.

Error correction by network error correction codes
Using network error correction codes, each node in group $G_1$ independently forms a random linear combination of $K_1$ and $K_2$, and then transmits such combined vector to $V$. Nodes in $G_2$ and $G_3$ similarly encode their respective keys.

Suppose there are two compromised nodes, as shown in Figure 7. Node $B$ first checks how many groups have consistent packets, i.e., decoding from each subset of two nodes results in the same decoded key values. Since there are no more than two adversaries, there is at least one consistent group. If there are only one consistent group, the compromised nodes must be distributed as in case one. Assume $G_3 = \{V_7, V_8, V_9\}$ is the Consistent group, then node $V$ can decode $K_2$ and $K_3$ from $G_3$. Using $K_2$, node $V$ can compute $K'_1$ from any packet transmitted from group $G_1$. Two of the packet from $G_1$ must be the same and valid. Thus node $V$ can decode $K_1$ by majority decoding.

Assume there are two consistent groups. Since the inconsistent group must contain a compromised node, each of the consistent groups has at least two valid packets. Thus, the keys decoded from the two consistent groups are correct, and can be used to correctly recover $\{K_1, K_2, K_3\}$.

If there are three consistent groups, then the two invalid packets must be in the same group (case two). As illustrated in Figure 7, suppose the packets transmitted by $V_5$ and $V_6$ are invalid. Since the packet transmitted by the non-compromised node $V_4$ is a linear combination of the correct keys $K_1$ and $K_2$, the keys decoded from $G_2$ must satisfy $K''_1 \neq K_1$ and $K''_2 \neq K_2$. Thus, the keys decoded from $G_2$ are inconsistent with those from both $G_1$ and $G_3$. However, the keys decoded from $G_1$ and $G_3$ are consistent with each other. Thus, node $V$ can tell that $K''_1$ and $K''_2$ from $G_2$ are invalid.

By Theorem 3, correcting two compromised nodes is the maximum error correction performance for this example.

REFERENCES

[1] H. Chan, A. Perrig, and D. Song. Key distribution techniques for sensor networks. Technical report, Carnegie Mellon University. Avaible at: http://www.cs.berkeley.edu/dawnsong/papers/randomkey.pdf.

[2] T. K. Dikaliotis, T. Ho, S. Jaggi, S. Vyetrenko, H. Yao, M. Effros, J. Kliewer, and E. Erez. Multiple-access network information-flow and correction codes. IEEE Trans on Information Theory, 2011.

[3] D. Huang and D. Medhi. A byzantine resilient multi-path key establishment scheme and its robustness analysis for sensor networks. In Proc. of 5th IEEE International Workshop on Algorithms for Wireless, Mobile, Ad Hoc and Sensor Networks, 2005.

[4] S. Jaggi, M. Langberg, T. Ho, and M. Effros. Correction of adversarial errors in networks. In Proc. of ISIT, 2005.

[5] M. Mitzenmacher and E. Upfal. Probability and Computing: Randomized Algorithms and Probabilistic Analysis. Cambridge University Press, 2005.

[6] H. Yao, D. Silva, S. Jaggi, and M. Langberg. Network codes resilient to jamming and eavesdropping. In Proc. of NetCod, 2010.

ANNEX 2

Multi-path Coding-based Key Establishment in Sensor Networks for Increased Compromise Resiliency

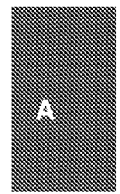

Contents

1. Introduction ... 1
2. Model ... 2
   - 2.1 Network Model ... 2
   - 2.2 Attacker Model ... 3
3. Background ... 3
   - 3.1 Direct, all pairwise key establishment ... 3
   - 3.2 Direct, connected graph key establishment ... 5
   - 3.3 Path-based, all pairwise key establishment ... 5
4. Multi-path Key Establishment ... 9
   - 4.1 Motivation ... 9
   - 4.2 Coding technique ... 9
   - 4.3 Logical topologies for multi-path key establishment ... 12
   - 4.4 Multi-path-based, all pairwise key establishment ... 14
   - 4.5 Multi-path-based, connected graph key establishment ... 14
5. Simulation Methodology ... 14
   - 5.1 Simulation goals ... 14
   - 5.2 Simulation parameters and metrics ... 16
   - 5.3 Simulator ... 16
6. Simulation Results ... 17
   - 6.1 Varied security parameters ... 17
   - 6.2 Varied physical topology properties ... 19
   - 6.3 All pairwise vs. connected graph establishment ... 22
   - 6.4 Varied number of paths in MP-AP ... 25
7. Related Work ... 27
8. Conclusion ... 28

1. INTRODUCTION

Wireless Sensor Networks (WSNs) enable monitoring of various environments at low cost. Such technology advances scientific discovery [], search for energy sources [hpw ], physical threat detection for national defense [], and others. However, any application is vulnerable [Karlof and Wagner 2003] to an adversary that eavesdrops on communication, disrupts routing, or injects messages. To ensure wide-spread adoption of WSNs for real-world application, basic security must be ensured. Many attacks can be foiled by sharing symmetric keys between physical neighbors to ensure link-level secrecy and data integrity through encryption and Message Authentication Codes (MACs).

The limited resources of WSNs makes establishing symmetric keys a difficult task. Furthermore, these resources may not improve in next generation sensors as one of the fundamental driving factors in WSN technology is to keep the sensor's capabili-

A.2 ties limited which allows future generation sensors to focus on improved battery life, smaller size, and reduced cost. The limited memory and computational constraints of sensors prohibits two typical ways of key establishment, presharing all pair-wise keys and Public Key Infrastructure (PKI). Another complicating factor of WSN security is the ease of physically compromising nodes as they are small and typically dispersed in large environment, so techniques must be resilient to a fraction of the nodes being compromised.

Various techniques from the literature have been proposed to tackle key establishment in wireless sensor networks. Many techniques preshare limited secret information such that after random physical placement many or all physical links share enough secret information to directly create a secret key [Blom 1985; Camtepe and Yener 2005]. Other techniques aim to tolerate more insiders by additionally using multi-hop communication to share keys through intermediate nodes [Chan and Perrig 2005]. However, just a single compromised intermediate node is capable of breaking secrecy by learning the established key or breaking correctness by altering the established key.

To increase resiliency of these path-based schemes, multiple paths can be used in combination with encoding to ensure secrets are established given that a minority of the paths are compromised. Encoding ensures that given an adversary sees the information and can modify the information along a few paths, the adversary cannot learn the secret or disrupt the establishment of the secret. With this technique, higher resiliency can be offered at lower communication and computation costs.

Our contributions are as follows:

— We detail an encoding technique designed to share a secret over multiple node-disjoint paths. The technique ensures secrecy and correctness given that fewer than half of the paths are compromised.
— We provide a full protocol description for using the multi-path encoding technique to establish secrets between physical links. The description covers how to distribute keys initially which requires different distributions than previous work on path-based establishment protocols.
— We provide an extensive simulation evaluation to answer important questions about how multipath key establishment schemes compare with existing techniques. We vary security parameters and topology characteristics and observe the changes in secure and overhead. We find important trends between multipath key establishment protocols and existing protocols to reveal the increased resiliency offered by increasing overhead to send along multiple paths.

We organize this work as follows: Section 2 presents our assumptions about the network and adversary. We present important existing work that also has similar assumptions in Section 3. We present our multipath encoding techniques and full protocol description in Section 4. We present our methodology which contains our specific goals of evaluation and simulation details in Section 5. The results of our simulations are presented in Section 6. Lastly, we discuss related work to ours in Section 7 and conclude in Section 8.

2. MODEL

We describe the network and attacker model here.

2.1. Network Model

The network consists of sensor nodes which have too little computation resources to perform public-key cryptography and too little memory to preshare all pairwise keys. The following steps are taken to establish pairwise keys between nodes:

(1) The network first initializes some secret information at sensor nodes.
(2) The sensor nodes are dispersed randomly and uniformly in an environment. We consider two-dimensional, square environments in this work, but our key findings in this work will also hold for three-dimensional or non-square environments.
(3) Sensor nodes discover their physical neighbors determined by a fixed transmission range. The transmission range is set large enough to ensure with high probability connectivity of the entire network.
(4) Pairs of physical neighbors aims to establish a secret key by using their preshared secret information, communicating directly, and communicating with other nodes over multi-hop paths. We assume multi-hop communication can ensure security techniques outside the scope of this work to ensure availability, but confidentiality and integrity of this multi-hop communication must be ensure by preshared secret information. The shared secrets will be denoted by $k_{i,j}$ which corresponds to a shared secret at $i$ between nodes $i$ and $j$ (the ordering of indices conveys where this key is), and $k_{i,j} \in \mathbb{F}_q$, so they are $log(q)$ bits in size.

2.2. Attacker Model

We assume consider an attacker with full knowledge of the network protocol being used and can conduct the following actions. First, the attacker compromises a random set of nodes and learns the secret information stored at this set of nodes. Second, the attacker can eavesdrop on any wireless communication while using any secret information it has to attempt to decrypt messages. Third, the attack can inject or modify information either as a participant in the protocol or between two honest nodes communicating. Lastly, the attacker can bias the multi-hop routing to favor compromised nodes as intermediates in the network protocol.

We do not permit the following adversarial actions as we consider them out of scope for this work, and these adversarial actions can be defended by various techniques in the literature. Firstly, the attacker is assumed to compromise nodes after step 2 in the network model description, so the attacker cannot harm the initialization of secret information at nodes. Secondly, the attacker cannot perform physical layer jamming attacks to disrupt communication. Finally, the attacker cannot disrupt the availability of multi-hop communication.

3. BACKGROUND

We provide background on important advancements from the literature for establishing symmetric keys in resource constrained networks while tolerating compromised nodes. First, we describe a technique [Blom 1985] that ensures all pairwise keys can be established directly with tolerance to compromised nodes. Second, is an advancement [Du et al. 2005] which increases tolerance to compromised nodes by directly establishing just enough links to create a connected graph. Lastly, we describe a technique [Chan and Perrig 2005] which indirectly establishes keys through paths of nodes which improves the amount of resilience achieved given the same memory constraints on nodes.

3.1. Direct, all pairwise key establishment

We denote this protocol, Direct and All Pairwise key establishment, as D-AP. The goal of this scheme is to predistribute limited secret information to nodes which ensures all physical links can directly establish a key. Out of all techniques we explore, this scheme is the most restrictive since secrets must be generated directly between a pair and all pairs of nodes must be able to establish a key. Such constraints limit the possible that can be provided to insider attackers.

A.4

We describe the protocol D-AP in Algorithm 1. At initialization, the source uses a secret matrix to create a secret vector for each node by taking the product of the secret matrix with a public vector at the node. The public vectors do not need to be stored but can instead be generated with a pseudo-random generator seeded by the node's public identifier. Any two nodes can share a secret key by taking the product of their own secret vector with the public vector of a neighboring node. If two nodes do this for each other, they obtain the same secret as seen in the following:

$$k_{i,j} = \vec{s}_i^T * \vec{p}_j \qquad (1)$$
$$= (X * \vec{p}_i)^T * \vec{p}_j \qquad (2)$$
$$= (\vec{p}_j^T * (X * \vec{p}_i))^T \qquad (3)$$
$$= ((\vec{p}_j^T * X) * \vec{p}_i)^T \qquad (4)$$
$$= ((X^T * \vec{p}_j)^T * \vec{p}_i)^T \qquad (5)$$
$$= ((X * \vec{p}_j)^T * \vec{p}_i)^T \qquad (6)$$
$$= (\vec{s}_j^T * \vec{p}_i)^T \qquad (7)$$
$$= k_{j,i}^T \qquad (8)$$
$$= k_{j,i} \qquad (9)$$

*Parameters and functions*

$X$: Randomly generated, symmetric matrix kept secret and used for initialization, $X \in \mathbb{F}_q^{m \times m}$
$\vec{p}_i$: Public vector for node $i$, $\vec{p}_i \in \mathbb{F}_q^m$
$\vec{s}_i$: Secret vector for node $i$, $\vec{s}_i \in \mathbb{F}_q^m$
PRG($x, y$): Pseudo-random generator with seed $x$ and output type $y$

*Preshared secret information for node $i$*

1: $\vec{p}_i := \text{PRG}(i, \mathbb{F}_q^m)$
2: $\vec{s}_i := X * \vec{p}_i$

*Establishment of secret $k_{i,j}$ at node $i$*

1: $\vec{p}_j := \text{PRG}(j, \mathbb{F}_q^m)$
2: $k_{i,j} := \vec{s}_i^T * \vec{p}_j$

Algorithm 1: D-AP: Direct all pairwise key establishment protocol

Attacker resilience. The scheme fails to securely establish keys when an attacker learns the secret matrix $X$. The attacker only learns the secret matrix $X$ if the attacker learns the value of $m$ secret vectors. The attacker can form both a matrix $S \in \mathbb{F}_q^{m \times m}$ by concatenating the $m$ secret vectors and a matrix $P \in \mathbb{F}_q^{m \times m}$ by concatenating $m$ public vectors (each corresponding to the respective secret vector in $S$). Then, the attacker has sufficient information to solve for the secret matrix, $X$, in the matrix equation $X * P = S$. The resilience of this scheme is tied directly to the memory burden at nodes, so more memory usage at nodes increases the number of nodes an attacker must compromise to learn the secret between two honest nodes establishing a physical link. Additionally, this scheme has an all or nothing type of resilience, either no link can be compromised or the attacker compromises a specific threshold of nodes and all links are compromised.

3.2. Direct, connected graph key establishment

The previous scheme, D-AP, requires all pairwise nodes be able to establish a key, this scheme based on the work [Du et al. 2005], Direct and Connected graph key establishment (denoted by D-CG), relaxes this specific constraint to allow for increased resilience. A wireless sensor network deployment does not need all possible physical links allowed by physical transmission ranges to be securely established for secure communication. The physical topology only needs to establish enough secure links to create a connected graph and rely on multi-hop communication over these secure links. The drawback of fewer physical links is an increase in shortest paths between a node pair or between nodes and a base station.

Existing work on random graphs [Erdős and Rényi 1960] has shown that a graph of $n$ nodes needs an average of $ln(n) + c$ neighbors where $c$ is a small value that controls the probability of the graph being connected. A reasonable value is $c = 11.5$ which corresponds to a 99.999% probability of connectivity. A wireless topology where each node has an average of $d$ physical neighbors (should ensure $d \geq ln(n) + c$) only needs to be establish connections with and average of $ln(n) + c$ of those nodes. In D-CG to ensure connectivity, a pair of nodes only needs to be capable of establishing a key with a probability of $\frac{ln(n)+c}{d}$.

We describe the protocol D-CG in Algorithm 2. At initialization, the source creates several secret matrices similar to the previous scheme D-AP, and each secret matrix represents a different *key space*. Each node will receive a random set of $r$ secret vectors which corresponds to $r$ different key spaces. The purpose of multiple key spaces is to limit the information an adversary obtains from compromising multiple nodes and their secret vectors, so a set of compromised nodes may only compromise certain key spaces while others still remain secret. The main trade-off is between resiliency and probability of honest nodes being capable of establishing a key. This scheme will setup parameters to maximize resiliency with the constraint that the probability of establishing a key is large enough to ensure a connected graph. Note that similar to D-AP, we leverage public pseudo-random generators to avoid storing public vectors at nodes.

Attacker resilience. The attacker utilizes compromised secret vectors in a way similar to that of D-AP. The difference in D-CG is that the attacker aims to learn multiple $X_b$ values by obtaining at least $\frac{m}{r}$ secret vectors. When the attacker has learned the key spaces denoted by $A$, then the attacker can learn any $k_{i,j}$ where $B_i \cap B_j \subseteq A$. So, the more key spaces learned by the attacker increases the number of links which are insecure. The scheme becomes more resilient to attackers as the storage at each node $m$ increases since more secret vectors are required to be compromised per key space. Additionally, the scheme becomes more resilient when the probability of key establishment can be lower which happens when $d$, the average physical neighbors at a node increases.

3.3. Path-based, all pairwise key establishment
??

The previous schemes rely on their distributions of secret information which both ensure pairwise nodes can establish keys while tolerating an adversary with some secret information. This path-based scheme [Chan and Perrig 2005], Path-based and All Pairwise key establishment (denoted by P-AP), bootstraps the network with a few pairwise keys to create a *logical topology* on top of the physical topology. Each edge in this logical topology represents two nodes that share an initialized pairwise key, and this pair can communicate using the untrusted physical topology while ensuring data confidentiality and integrity. All physical links that must be established can send a

A.6

*Parameters and functions*
- $r$: Number of secret vectors stored at a node
- $\omega$: Parameter set to ensure connected graph
- $B_i$: Set of identifiers for key spaces stored at a node $i$
- $X_b$: $b$th randomly generated, symmetric matrix kept secret and used for initialization, $X_b \in \mathbb{F}_q^{\overline{\eta} \times \overline{\eta}}$
- $\vec{p}_{i,b}$: $b$th public vector for node $i$, $\vec{p}_{i,b} \in \mathbb{F}_q^{\overline{\eta}}$
- $\vec{s}_{i,b}$: $b$th secret vector for node $i$, $\vec{s}_{i,b} \in \mathbb{F}_q^{\overline{\eta}}$
- $PRG(x,y)$: Pseudo-random generator with seed $x$ and output type $y$

*Preshared secret information for node $i$*
1: $B_i := \emptyset$
2: for all $1 \leq a \leq r$ do
3:    $B_i := B_i \cup PRG(i \oplus a, \mathbb{Z}_\omega)$
4: end for
5: for all $b \in B_i$ do
6:    $\vec{p}_{i,b} := PRG(i \oplus b, \mathbb{F}_q^{\overline{\eta}})$
7:    $\vec{s}_{i,b} := X_b * \vec{p}_{i,b}$
8: end for

*Establishment of secret $k_{i,j}$ at node $i$*
1: $B_j := \emptyset$
2: for all $1 \leq a \leq r$ do
3:    $B_i := B_i \cup PRG(i \oplus a, \mathbb{Z}_\omega)$
4:    $B_j := B_j \cup PRG(j \oplus a, \mathbb{Z}_\omega)$
5: end for
6: if $B_i \cap B_j = \emptyset$ then
7:    $k_{i,j} := NULL$
8: else
9:    $k_{i,j} := 0$
10:    for all $b \in (B_i \cap B_j)$ do
11:      $\vec{p}_{j,b} := PRG(j + b, \mathbb{F}_q^{\overline{\eta}})$
12:      $k_{i,j} := k_{i,j} \oplus \vec{s}_{i,b} * \vec{p}_{j,b}$
13:    end for
14: end if

Algorithm 2: D-CG: Direct, connected graph key establishment protocol generated secret key along a shortest path in the logical topology which is insecure if and only if an intermediate forwarder has been compromised.

The important characteristics of the initial logical topology is the degree of each node, the number logical hops between two nodes, and the number of possible logical paths between two nodes. The degree of each node corresponds to the number of initial pairwise keys at a given node. The greater the number of logical hops will increase communication overhead and decrease tolerance as any forwarder could learn the secret being shared. The greater the number of logical paths between two nodes decreases communication overhead as paths with fewer physical hops can be found and decreases tolerance to compromises as an attacker can modify routing information to become part of the logical path.

Graphs arranged in a grid offer good properties for a logical topology in terms of low memory overhead and high resilience. An example of such a logical topology is in Fig-

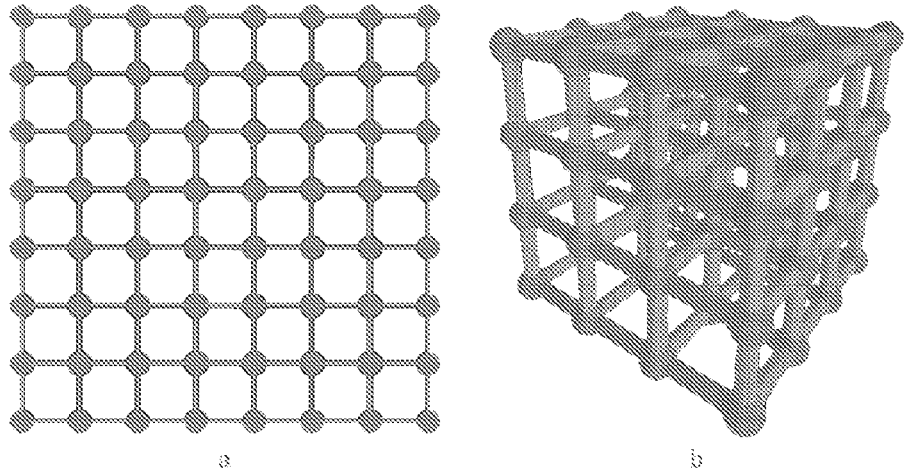

Fig. 1. A visualization of a (a) 2-dimensional and (b) 3-dimensional logical topology. Note, that all logical links exist between all nodes that differ in only one dimension. For example, in the 2-dimensional case, all possible pairs of nodes in a single row will share a unique pairwise key making them all logical neighbors of each other.

ure 1a, where all nodes belonging to the same row or column are actually connected. Thus, in this 64-node example, each node is in a row and column with 7 other nodes each meaning each node has 14 logical neighbors (memory overhead can be reduced by half according to Remark 3.2). Furthermore, any pair of nodes can establish a logical path of at most 2 hops meaning that one intermediate node is used to share a secret. Note that such a technique generalizes to any higher dimension which offers different parameters with various overhead/resilience trade-offs. A three-dimension logical topology is shown in Figure 1b which also has 64 nodes. Note that there is lower memory overhead in this case as each node has 9 logical neighbors, and there are now at most 3 logical hops between any pair of nodes. A more graph theoretic perspective of these logical topologies is described in Remark 3.1.

*Remark* 3.1. A logical topology with $x$ dimensions is equivalent to the cartesian product of complete graphs ($K_z$ denotes a complete graph of order $z$). For example, a 2 dimensional logical topology is $K_{\sqrt{n}} \times K_{\sqrt{n}}$ and a 3 dimensional logical topology is $K_{\sqrt[3]{n}} \times K_{\sqrt[3]{n}} \times K_{\sqrt[3]{n}}$. Such can be generalized to any number of dimensions, and if done with a high enough $x$ such that $\sqrt[x]{n} = 2$ then the logical topology is identical to an $x$ dimension hypercube.

*Remark* 3.2. The memory overhead can be roughly half the degree at each node in the logical topology. A pair of nodes $i$ and $j$ sharing a pairwise key $k_{i,j} = k_{j,i}$ does not need to store two full pairwise keys between them due to the following technique [Chan and Perrig 2005; Huang et al. 2005]. Each node $i$ can store its own secret $k_i$, and then for a pairwise key $k_{i,j}$ either $i$ stores $H(k_j \| i)$ while $j$ can compute this value or $j$ stores $H(k_i \| j)$ while $i$ can compute this value ($H(\cdot)$ is a cryptograph hash function). The real memory overhead is proportional to the number of edges in the logical topology per node instead of the degree at each node.

We describe the protocol P-AP in Algorithm 3. At initialization, the source initializes pairwise keys between all logical neighbors. To establish a secret between two physical

A.3 neighbors, one node initiates by creating a pairwise key and finds a path in the logical topology and sends the pairwise key along with the logical path to the first hop. The message is encrypted and appended with a MAC for confidentiality and integrity for each logical hop. When forwarding a message, the message must be decrypted and verified with the key shared with the node that sent the message while then re-encrypted and appended with a MAC with a key shared with the next logical neighbor. The forwarding occurs until the final hop receives the message.

*Parameters and functions*

$L_i$: The set of logical neighbors for node $i$ determined by the logical topology
S-PRG($x$): Secure pseudo-random generator for output type $x$
Shortest_Path($i,j$): From routing layer determines shortest path in logical topology from $i$ to $j$ returned as a list of nodes
Pop_Front($x$): Pops front element of list and returns that element
$E_k(x)$: Encrypts $x$ with key $k$
$D_k(x)$: Decrypts $x$ with key $k$
$MAC_k(x)$: Creates MAC of $x$ with key $k$
Send($x,y$): Use routing layer to send message $y$ to node $x$

*Preshared secret information for node $i$*
1: for all $j \in L_i$ do
2: $\quad k_{i,j} := $ S-PRG($\mathbb{F}_q$)
3: end for

*Establishment of secret $k_{i,j}$ at node $i$ (only for $i < j$)*
1: if $j \notin L_i$ then
2: $\quad P := $ Shortest_Path($i,j$)
3: $\quad k_{i,j} := $ S-PRG($\mathbb{F}_q$)
4: $\quad w := $ Pop_Front($P$)
5: $\quad M := (k_{i,j}, P)$
6: $\quad $ Send($w, (E_{k_{i,w}}(M), MAC_{k_{i,w}}(M))$)
7: end if

*Received message $(E_{k_{v,u}}(M), MAC_{k_{v,u}}(M))$ from $v$ at $u$*
1: $M := D_{k_{v,u}}(E_{k_{v,u}}(M))$
2: if $MAC_{k_{v,u}}(M) = MAC_{k_{v,u}}(M)$ then
3: $\quad (k_{i,j}, P) := M$
4: $\quad $ if $j = u$ then
5: $\quad\quad k_{i,j} := k_{i,j}$
6: $\quad $ else
7: $\quad\quad w := $ Pop_Front($P$)
8: $\quad\quad M := (k_{i,j}, P)$
9: $\quad\quad $ Send($w, (E_{k_{u,w}}(M), MAC_{k_{u,w}}(M))$)
10: $\quad $ end if
11: end if

Algorithm 3: P-AP: Path-based, all pairwise key establishment protocol

Attacker resilience. The advantage of this scheme is that only pairwise keys are distributed at the start, so these pairwise keys cannot be learned from other secret information in the network. The weakness is that a single compromised node allows an attacker to compromise all links that use that compromised node as an intermediate node in the logical topology. As the initial routing may be insecure, an attacker could

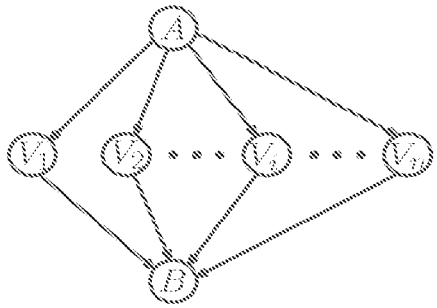

Fig. 2. The logical two-hop model for the path-key establishment problem.

bias the routing information to ensure it is part of more logical paths that are chosen to minimize communication.

4. MULTI-PATH KEY ESTABLISHMENT

4.1. Motivation

Let $\mathbb{F}_q$ be a finite field with size $q$. In multi-hop network $\mathcal{N}$, assume node $A$ want to transmit a secret key $K \in \mathbb{F}_q^k$ to node $B$ through $\mathcal{N}$. Due to the key pre-distribution stage [?], we assume each node in $\mathcal{V} = \{V_1, V_2, ..., V_n\}$ shares a secret key with both $A$ and $B$. Thus, as shown in Figure 2, each node in $\mathcal{V}$, say $V_i$, sets up a logical two-hop path between $A$ and $B$ [?]. If $V_i$ is a honest node, such path is secure. We assume the capacity of each path is $C$ symbols in $\mathbb{F}_q$.

We assume $z$ nodes in $\mathcal{V}$ are compromised by an adversary, who can both eavesdrop the packet and change the packets forwarded. Due to disturb the key establishment.

We consider a toy case in which $n = 3$ and $z = 1$, as shown in Figure 3. Node $A$ constructs three packet $P_1$, $P_2$ and $P_3$, to deliver along $V_1$, $V_2$ and $V_3$ respectively. In particular, $P_i$ is constructed as $[h_i^j, h_i^k, m_i]$, where $m_i$ is the message part, $j \neq k$, $j \neq i$ (and $k \neq i$) and $h_i^j$ (and $h_i^k$) is a hash check for the message part in packet $P_j$ (and $P_k$).

By receiving the three packet, $\{P_1, P_2, P_3\}$, node $B$ performs the following decoding scheme. For the message part of each received packet, say $\tilde{m}_i$, node $B$ checks how many hash checks in other packets agree with $\tilde{m}_i$. If there exists at least one hash check agrees with $\tilde{m}_i$, node $B$ accepts $\tilde{m}_i$ as the correct message $m_i$; otherwise, $\tilde{m}_i$ is thought as a erroneous message.

For instance, assume node $V_2$ compromised and $\tilde{P}_2 \neq P_2$. Thus, for $\tilde{m}_1$ (or $\tilde{m}_3$), at least $h_1^2$ (or $h_3^2$) agrees with it. On the other hand, for erroneous $\tilde{m}_2$, neither $h_1^2$ or $h_3^2$ would agree with it.

4.2. Coding technique

THEOREM 4.1. *For the path-key establishment problem above,*

— *If $z \leq \lfloor (n-1)/2 \rfloor$, there exists exists polynomial time scheme such that A can transmit K to B secretly and correctly. The computational complexity is $O(C \log(n) M(n))$, where $M(n)$ is the matrix multiplication complexity for dimensions $n \times n$. In particular, the adversary can get zero information about K, and the probability that B cannot decode K is $O(\exp(n)C/q)$.*

— *Else if $z > \lfloor (n-1)/2 \rfloor$, for any $k$ and $C$, with a probability 1 node A cannot transmit K to B for any scheme.*

In this subsection, the complete construction is provided for the path-key establishment defined in 4.1. In the following, we use $z_m$ to denote $\lfloor (n-1)/2 \rfloor$.

A:10

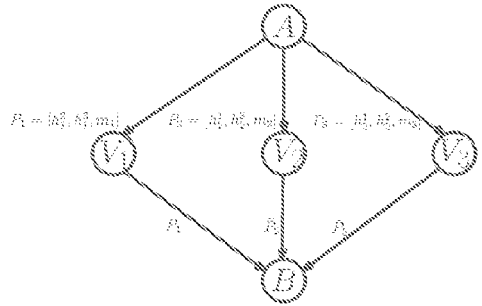

Fig. 3. The illustrating example for the scheme in [?].

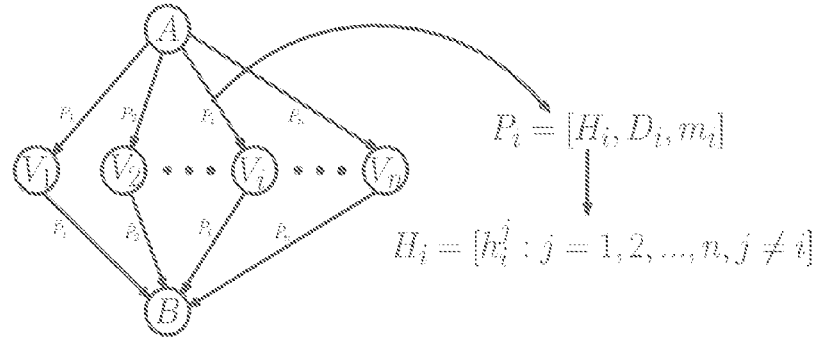

Fig. 4. The coding construction at node $A$.

Encoder at node $A$.

— Node $A$ independently and uniformly generates $z_m$ random packets $\mathcal{R} = \{R_1, R_2, ..., R_{z_m}\}$ over $\mathbb{F}_q^k$.
— Node $A$ independently and uniformly generates $n$ random packets $\mathcal{D} = \{D_1, D_2, ..., D_n\}$ over $\mathbb{F}_q^m$.
— As shown in Figure 4, node $A$ constructs $n$ packets $\mathcal{P} = \{P_1, P_2, ..., P_n\}$, each of which is delivered through one of $\mathcal{V} = \{V_1, V_2, ..., V_n\}$.
— Packet $P_i$ is constructed as $P_i = [H_i, D_i, m_i]$, as shown in Figure 4.
  — Message $m_i$ is a linear combination of $K$ and the packets in $\mathcal{R}$, i.e., $m_i = \sum_{t=1}^{z_m}(c_i)^t R_t + (c_i)^{z+1}$. We assume $c_1, c_2, ..., c_n$ are distinct and publicly known.
  — As shown in Figure 4, hash head $H_i$ is constructed as $H_i = \{h_i^j : j = 1, 2, ..., n, j \neq i\}$. Hash $h_i^j \in \mathbb{F}_q^2$ is defined as $h_i^j = [\alpha_i^j, v_i^j]$, where $\alpha_i^j$ is independently and uniformly chosen from $\mathbb{F}_q$ and $v_i^j$ is the linear product between $[D_j, m_j]$ and vector $[(\alpha_i^j)^1, (\alpha_i^j)^2, ..., (\alpha_i^j)^{z_m+k}]$.

For each intermediate node in $\mathcal{V}$, say $V_i$, $V_i$ directly forwards $P_i$ to node $B$.

Decoder at node $B$.

— From node $V_i$, node $B$ receives packet $\bar{P}_i = [\bar{H}_i, \bar{D}_i, \bar{m}_i]$.
— For message $\bar{m}_i$, node $B$ check whether hash $\bar{h}_i^j = [\bar{\alpha}_i^j, \bar{v}_i^j]$ agrees with $\bar{m}_i$.

- Message $\bar{m}_i$ is said to be agreed with $h_i^j$ if and only if $v_i^j$ is equal to the inner product of $[D_j, \bar{m}_i]$ and vector $[(\alpha_i^j)^1, (\alpha_i^j)^2, ..., (\alpha_i^j)^{z_m+k}]$.
- Message $\bar{m}_i$ is accept as a valid message if and only if there are at least $z_m$ hashes agree with it.
- If there are more than $z_m + 1$ valid messages, node $B$ have $z_m + 1$ random linear combinations for $Z \cup R$. If they are all linear independent, node $B$ can decode $K$ by Gaussian Elimination.

In the next subsection, we prove that when the number of of compromised nodes, i.e., $z$, is no larger than $z_m$, with a high probability node $B$ can decode $K$.

For the codes constructed above, we have the following theorem.

THEOREM 4.2. *When $z \leq z_m$, the adversary can only get zero information about the key $K$, and node $B$ can decode $K$ with a probability at least $1 - O(n^2C/q)$. The encoding and decoding complexity is $O(C \cdot M(n))$, where $M(n)$ is the complexity of matrix multiplication for dimensions $n \times n$.*

PROOF. We first prove the secrecy. Without loss of generality, we assume $z = z_m$, nodes $V_1, ..., V_{z_m}$ are compromised and therefore packets $P_1, P_2, ..., P_{z_m}$ are eavesdropped. For any $j > z_m$, if $\alpha_1^j, \alpha_2^j, ..., \alpha_{z_m}^j$ are not distinct, the information in $h_1^j, h_2^j, ..., h_{z_m}^j$ is redundant. Thus, we can assume $\alpha_1^j, \alpha_2^j, ..., \alpha_{z_m}^j$ are distinct, which only strengthen the eavesdropping capability of the adversary.

To prove the secrecy, it is sufficient to prove that for any $K \in \mathbb{F}_q^k$, there exist exactly one possible $(D, R)$ resulting in $\{P_1, P_2, ..., P_{z_m}\}$. For any $K \in \mathbb{F}_q^k$, to result in $\{m_1, m_2, ..., m_{z_m}\}$, the $z_m$ vectors in $R$ needs to satisfy $z_m$ linear vector equations. Since $c_1, c_2, ..., c_{z_m}$ are distinct, due to the property of Vandermonde matrix, such $z_m$ linear vector equations are independent. Thus, there is exactly one possible sample of $R$.

For each $j > z_m$, to agree with $\{h_1^j, h_2^j, ..., h_{z_m}^j\}$, the $z_m$ elements in $D_j$ needs to satisfy $z_m$ linear equations. Since $\alpha_1^j, \alpha_2^j, ..., \alpha_{z_m}^j$ are distinct, due to the property of Vandermonde matrix, such $z_m$ linear equations are independent. Thus, there is exactly one possible sample of $D_j$.

Thus, we complete the proof of secrecy. In the following we prove that node $B$ can decode key $K$ with a probability $1 - O(nC/q)$. Since $n \geq 2z_m + 1$, for any valid received packet $P_i = [H_i, D_i, \bar{m}_i] = P_i$, there are at least $z_m$ hashes from other received packets agree with $\bar{m}_i$. For any corrupted packet $P_i = [H_i, D_i, \bar{m}_i]$, if $[D_i, \bar{m}_i] \neq [D_i, m_i]$, in the following we compute the probability that the hash of a valid packet agrees with $\bar{m}_i$. Assume $P_j = P_j$ is valid, since the adversary has no information about $\alpha_i^j$, the probability that it can forge $[D_i, \bar{m}_i]$ to agree with $h_i^j$ is no more than $O(C/q)$. Using union bound [], the probability is no more than $O(nC/q)$ that $[D_i, \bar{m}_i]$ agrees with the hash of a valid packet.

Also using the union bound [], the probability is no more than $O(n^2C/q)$ that node $B$ will accept a corrupted message $\bar{m}_i$. Thus, with the at least $z_m + 1$ valid messages, node $B$ can decode $K$ by solving $z_m + 1$ linear vector equations. Since any $z_m + 1$ of $c_1, c_2, ..., c_n$ are distinct, due to the property of Vandermonde matrix, such $z_m + 1$ linear vector equations are independent. Thus, node $B$ can decode $K$ correctly.

For node $A$, the computational complexity of constructing each $P_i$ is $O(nC)$. Thus the total complexity of $A$ is $O(n^2C)$. For node $B$, the computational complexity of checking each $P_i$ is $O(nC)$. Thus the total complexity of checking is $O(n^2C)$. Since, the complexity of linear decoding $K$ from the valid messages is $O(M(n)C)$, the total complexity of $B$ is $O(M(n)C)$.

A:12

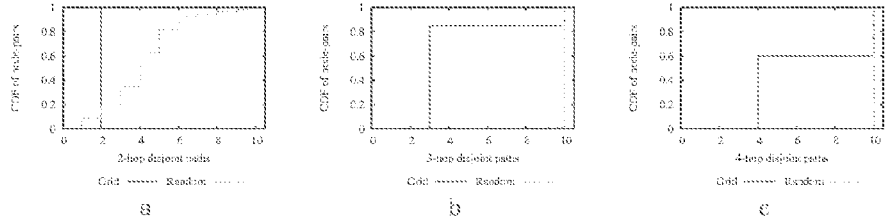

Fig. 5. CDF of disjoint paths possible in grid and random topologies for varying memory requirements (a) $m = 65$, (b) $m = 25$, and (c) $m = 17$.

□

4.3. Logical topologies for multi-path key establishment

The multi-path key establishment relies on an initial logical topology that describes how pairwise keys are distributed. Here, we describe the constraints on such a logical topology, the desirable graph characteristics of the logical topology, and detail an approach to creating a logical topology.

The logical topology must have an order equal to the desired number of nodes being used, and the allowable edges are constrained by the amount of memory at each node. Specifically, with the memory optimization of Remark 3.2 a node with $m$ memory can store pairwise keys for $m - 1$ neighboring nodes while those neighboring nodes do not need to store the same pairwise keys. With this memory constraint the average degree in the logical topology is $2 * (m - 1)$.

We desire a logical topology that offers high resilience for the coding-based multi-path key establishment. A logical topology must at least have multiple node-disjoint paths. Additionally, the shorter the paths are in terms of logical hops the better as a single forwarder along a path corrupts the entire path. Shorter logical paths will also reduce the communication overhead. To compare logical topologies, we focus on minimizing the path-lengths of a set of shortest node-disjoint paths. These shortest node-disjoint paths are the best candidates for a multi-path key establishment.

The logical topologies proposed in previous work [Chan and Perrig 2005] are cartesian products of complete graphs (see Remark 3.1). We denote the cartesian product of $n$ complete graphs which each have order $b$ as $K_b^n$, and we denote these kind of graphs as *grid* topologies due to their visual grid structure as seen in Figures 1a & 1b. We compare the graph structure of grid topologies with *random* topologies to surprisingly find that random topologies offer greater resiliency in terms of node-disjoint paths that benefits multi-path key establishment. We denote a random topology of $n$ nodes with memory constraints of $m$ keys per node as $R(n, m)$.

We first examine topologies where $n = 4096$ and $m$ has values 65, 25, or 17 which are ideal parameters for the grid topology since these selections ensure $n = \left(\frac{m+1}{2}\right)^a$ where $b = \frac{m+1}{2}$ and $a$ is an integer parameter of the grid topology. We compare grid and random topologies in terms of the number of node-disjoint paths they can create of some desired hop-length or less, and we display this as a Cumulative Distribution Function (CDF) over randomly selected node-pairs. Additionally, we only display the first 10 disjoint paths found as further disjoint paths are less useful and require more computation time to analyze. To find the first 10 disjoint paths, we implement a greedy algorithm which finds a shortest path, removes the intermediate nodes and repeats until 10 disjoint paths are found (the length-bounded disjoint path problem is NP-Complete [Itai et al. 2006]).

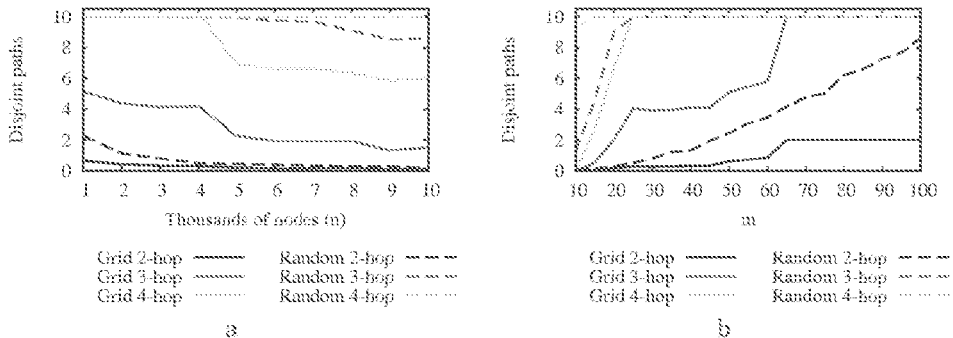

Fig. 6. Average number of disjoint paths of varying lengths for grid and random topologies of a given length by varying (a) $n$ (nodes) while $m = 25$ and (b) $m$ (memory) while $n = 4096$.

We compare 2-hop disjoint paths of $K_{64}^2$ with $R(4096, 65)$ in Figure 5a, 3-hop disjoint paths of $K_{16}^3$ with $R(4096, 25)$ in Figure 5b, and 4-hop paths of $K_8^4$ with $R(4096, 17)$ in Figure 5c. We find that despite a grid topology $K_i^a$ being created specifically to ensure $a$-hop paths, a random topology can ensure more $a$-hop paths when being created with the same constraints. We notice the following from these results:

— From figure 5a, the random topology has more disjoint 2-hop paths than than the grid topology in the average case. The grid topology has a slight advantage as 10% of node-pairs in random only have 1 2-hop path while every node-pair in grid has 2 2-hop paths.
— From figure 5b, the grid topology is limited to 3 3-hop paths in 80% of random node-pairs while the random topology has 10 (or more) 3-hop disjoint paths in nearly all random node-pairs (small proportion 1% of node-pairs only have 9 3-hop paths).
— From figure 5c, the grid topology is limited to 4 4-hop paths in 60% of random node-pairs while the random topology has 10 (or more) 4-hop disjoint paths in all random node-pairs.

We have explored the fine-grained differences in terms of the distributions of numbers of disjoint paths finding the random graphs offer advantages, and now we show further advantages of random graphs as their also quite flexibility to various parameter settings. We vary nodes and memory in Figure 6, and we consistently find that the random topology offers more node-disjoint paths of any length in every situation. This is visibility noticed as the dashed lines (random) have higher values than solid lines (random) for each color (hop length).

The evidence we have shown overwhelmingly suggests random topologies are more suitable than grid topologies for the purpose of creating node-disjoint paths of short lengths which translates to increased resiliency in multi-path key establishment schemes. Additionally, previous work such as PIKE [Chan and Perrig 2005] could gain communication and resiliency advantages from this technique as well. We explored other graph constructions that scale, but we found none that out-performed random in terms of short node-disjoint paths, and we leave that as an open problem that could benefit any key establishment schemes that rely on a logical topology.

In addition to random topologies having increased resiliency properties than the well-structure logical topologies, the random logical topologies have greater flexibility in terms of the parameters that capture the network requirements (nodes $n$ and

A:14 memory per node $m$). The logical topologies $K_j^a$ are less flexible and lose some of their resiliency when there does not exist an $a$ and $b$ such that $a^b = n$ and $a + 1 = m$.

4.4. Multi-path-based, all pairwise key establishment

We present the novel scheme, MP-AP, which utilizes multiple node-disjoint paths in a logical topology to increase resiliency of key establishment. The major downside compared to P-AP (i.e., single path key-establishment) is the increased communication overhead which we quantify later in simulation experiments. So, the MP-AP should expect higher resiliency and communication overhead compared to P-AP as well as the direct schemes D-AP and D-CG.

We describe the protocol MP-AP in Algorithm 4. At initialization, the source initializes pairwise keys between all logical neighbors. To establish a secret between two physical neighbors, one node initiates by creating and encoding a pairwise key for $\beta$ disjoint paths and sends the distinct messages along each disjoint path. The messages are encrypted and appended with a MAC to ensure confidentiality and integrity with nodes along the logical path. At each hop, the message is decrypted and verified and then re-encrypted and appended with a new MAC with the key of the next logical hop. The forwarder continues until the ultimate destination receives enough pieces of the secret to perform decoding.

Attacker resilience. The scheme shares a secret successfully if a majority, $\frac{\beta+1}{2}$ (we assume $\beta$ is odd), of the $\beta$ disjoint paths consist of nodes that follow the protocol correctly. Alternatively if an attacker has compromised at least one node on a majority of the paths, then the attacker can learn the secret being established. Additionally, the coding techniques ensure correctness, so an attacker that controls less than the majority of disjoint paths cannot even prevent a secret from being established.

4.5. Multi-path-based, connected graph key establishment

Unsure yet if we want to create this? Could be trivially possible to reduce communication. Additionally, with smarter logical topology, we could ensure shorter disjoint paths.

5. SIMULATION METHODOLOGY

We describe our goals for simulation, metrics to measure overhead and security, topology construction, and simulator.

5.1. Simulation goals

We aim to answer the following three specific questions pertaining to compare the efficacy of key establishment schemes:

— *Question 1:* How do changes in the proportion of compromised nodes and available memory affect security for each scheme? (results in Section 6.1)
— *Question 2:* How do changes in the physical topology affect overhead and security for each scheme? (results in Section 6.2)
— *Question 3:* How do schemes that aim to connect all pairwise nodes compare with those that aim to connect just enough pairwise nodes for a connected graph? (results in Section 6.3)
— *Question 4:* How do changes in the number of disjoint paths in the multipath schemes affect overhead and security? (results in Section 6.4)

Our methodology for simulations is based around answering these questions. So, we have parameters and metrics designed to accurately measure security and overhead.

*Parameters and functions*

$L_i$: The set of logical neighbors for node $i$ determined by the logical topology
$\beta$: Number of disjoint paths to use
$S\text{-}PRG(x)$: Secure pseudo-random generator for output type $x$
$Disjoint\_Paths(i, j, x)$: Computes set of $x$ of disjoint paths in logical topology from $i$ to $j$
$Pop\_Front(x)$: Pops front element of list and returns that element
$Encode(x, y)$: Encodes set of messages for secret $x$ for $y$ disjoint paths
$Decode(x)$: Decodes set of messages $x$ and returns the secret if correct decode otherwise returns *NULL*
$E_k(x)$: Encrypts $x$ with key $k$
$D_k(x)$: Decrypts $x$ with key $k$
$MAC_k(x)$: Creates MAC of $x$ with key $k$
$Send(x, y)$: Use routing layer to send message $y$ to node $x$

*Preshared secret information for node $i$*
1: for all $j \in L_i$ do
2:    $k_{i,j} := S\text{-}PRG(\mathbb{F}_q)$
3: end for

*Establishment of secret $k_{i,j}$ at node $i$ (only for $i < j$)*
1: if $j \notin L_i$ then
2:    $D := Disjoint\_Paths(i, j, \beta)$
3:    $k_{i,j} := S\text{-}PRG(\mathbb{F}_q)$
4:    $T_i := Encode(k_{i,j}, \beta)$
5:    for all $P \in D, t_i \in T_i$ do
6:        $v := Pop\_Front(P)$
7:        $M := (t_i, P)$
8:        $Send(v, (E_{k_{i,v}}(M), MAC_{k_{i,v}}(M)))$
9:    end for
10: end if

*Received message $(E_{k_{v,u}}(M), MAC_{k_{v,u}}(M))$ from $v$ at $u$*
1: $M := D_{k_{v,u}}(E_{k_{v,u}}(M))$
2: if $MAC_{k_{v,u}}(M) = MAC_{k_{v,u}}(M)$ then
3:    $(t_i, P) := M$
4:    if $j = u$ then
5:        $T_j := T_j \cup t_i$
6:    else
7:        $w := Pop\_Front(P)$
8:        $M := (t_i, P)$
9:        $Send(w, (E_{k_{u,w}}(M), MAC_{k_{u,w}}(M)))$
10:   end if
11: end if

*When receiving a $t_i$ and $|T_j| \geq \frac{\beta+1}{2}$ at node $j$*
1: $x := Decode(T_j)$
2: if $x \neq NULL$ then
3:    $k_{i,j} := x$
4: end if

Algorithm 4: MP-AP: Multi-path-based, all pairwise key establishment protocol

A.16

Table I. Simulation parameters

| Parameter | Default value | Description |
|---|---|---|
| Proportion compromised nodes | 10% | This is the proportion of nodes uniformly randomly selected to be compromised nodes |
| Memory | 60 | This is the amount of available memory to initialize with secret information. We express memory in units of symmetric secret key sizes, so a typical value may be 256 bits which may need to increase in the future. |
| Nodes | 1000 | This is the number of nodes in the physical topology. |
| Density | 30 | This is the average number of physical neighbors. We control this by appropriately setting the transmission range based on density and number of nodes. |

Table II. Simulation metrics

| Metric | Description |
|---|---|
| Proportion Insecure links | Each protocol has some weakness to compromised nodes which results in an insecure physical link where the adversary learns the secret being established. This metric captures the proportion of physical links which are insecure. |
| Communication overhead | Communication overhead is the average amount of data broadcasted at a node for establishing all links in the network. |

We strive to keep communication and topologies very general so they can be applied to a wide-range of sensor networks with various communication models.

5.2. Simulation parameters and metrics

We describe the parameters we vary for simulations along with the metrics we measure from each simulation which allow us to achieve our simulation goals. We summarize parameters in Table I and metrics in Table II. In our evaluation section we always vary a parameter for experiments, so we show the default parameters for the remaining parameters in Table I which could be representative of a realistic scenario.

The security parameters are proportion of compromised nodes in the network and memory available for secret key initialization (shown in Table I). The proportion of compromised nodes shows how secure each protocol is in scenarios with varying degrees of compromise. Each protocol can increase its resiliency by increasing the amount of secret information at a node, so we also vary the bound on available memory to see how this affects the security of each scheme.

The physical topology parameters are nodes and density (shown in Table I). We construct random physical topologies by uniformly randomly placing nodes in a two dimensional square. A communication range is calculated to ensure that a desired estimated density is ensured, and that communication range is used for every node. With the communication range, we construct a topology where physical links exist between any pair of nodes which are within communication range of each other. By varying the number of nodes and density we can see how security and overhead of each protocol is affected.

The metrics used are proportion insecure links and communication overhead (shown in Table II). From proportion insecure links we are able to show how resilient a protocol is to compromised nodes. The path-based protocols require communication to establish keys through other intermediate nodes, so we are able to express this cost in terms of communication overhead.

5.3. Simulator

We built a custom simulator that focuses on accurately capturing the specific metrics for each protocol considered. The physical topology, logical topology, and compromised nodes are setup for a given simulation run. Given this setup, for each physical link out of a representative random sample of physical links, we evaluate the discussed metrics for each protocol. To obtain the security metrics involves checking which of the compromised nodes are used for path establishment, and to obtain overhead we perform best-path calculations over the physical topology for each link used in the logical topology and multiply by the amount of bits for the key establishment message.

We have a lot of flexibility in our custom simulator, but we do give up on trying to perfectly capture the physical layer properties and thus have rough estimates of realistic communication overhead. The communication overhead we show is accurate if the average ETX were the ideal 1.0, but in reality it is higher and all communication overhead results could be increased by a factor of the average ETX to be more realistic. However, this communication overhead is useful to compare and contrast these protocols as the ratio between communication overhead of two schemes is representative of a realistic scenario where packet loss occurs.

To estimate metrics for general cases given a set of parameters, we randomly generate 10 topologies and simulate the establishment of 1000 physical links and average the metrics from these simulations. We found very little variation in our results by averaging our results over 10000 physical links. For the metric of communication overhead we find the average communication overhead required for establishing one link and multiply by the average number of total physical links to estimate the average communication overhead for setting up an entire network.

6. SIMULATION RESULTS

Based on the methodology described above, we present our simulation results. We organize this section into subsections that correspond to the questions posed in Section 5.1 that capture our goals of evaluating these protocols.

For those evaluation goals that are agnostic of whether all pairwise keys are being established or just enough for a connected graph, we default to the scenario where all pairwise keys are being established. In these evaluations we highlight differences between direct, path-based, and multipath-based (with desired number of paths) protocols, and these trends are similar if all protocols were performing connected graph establishment instead. We do provide a comparison between all pairwise establishment and connected graph establishment in Section 6.3.

Each figure shows certain parameters being varied. Those parameters not varied take on default values of 1000 nodes, density of 30, memory of 60, and 10% proportion of compromised nodes (as noted in Table 1). These parameters were chosen to represent a possible wireless sensor network scenario. Also, for different but similar scenarios that may scale all values up or down, the fundamental trends we show should still hold.

6.1. Varied security parameters

We find the affects on security when varying the two parameters that have obvious correlations with security. Firstly, we vary the proportion of compromised nodes as the more nodes controlled by an attacker the more secret information learned which can be used to compromise more key establishment attempts. Secondly, we vary the budget each node has for storing secret information which directly affects whether the adversary can compromise key establishment attempts.

A:18

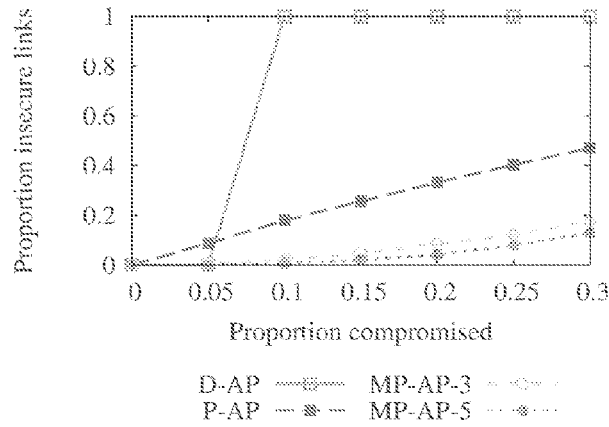

Fig. 7. Proportion of insecure links when varying proportion compromised nodes for representative all pairwise establishment protocols.

Figure 7 shows protocols under varying degrees of attack by altering the proportion of compromised nodes. These protocols are all using the same memory budget at each node (memory equivalent to 60 symmetric secret keys), so we are observing the difference in how each protocol resists colluding attackers. The D-AP is all-or-none type of protocol where either all links are secure or no links are secure, and the main drawback is that the threshold of number of attackers where all links are insecure is quite low, and it is analytically 0.06 proportion of compromised nodes. So, at very low proportion of compromised nodes, the D-AP actually performs the best, but it quickly is overtaken significantly by the protocols using paths. The difference between the P-AP and MP-AP protocols is roughly 0.2 more proportion of links being insecure. This observation shows that the multiple paths are indeed increasing resiliency as more compromised nodes must be compromised before all multiple paths are compromised. We investigate more later in Section 6.4 the difference in the number of paths (i.e., MP-AP-3 vs MP-AP-5) which favors more paths when more memory exists in the network.

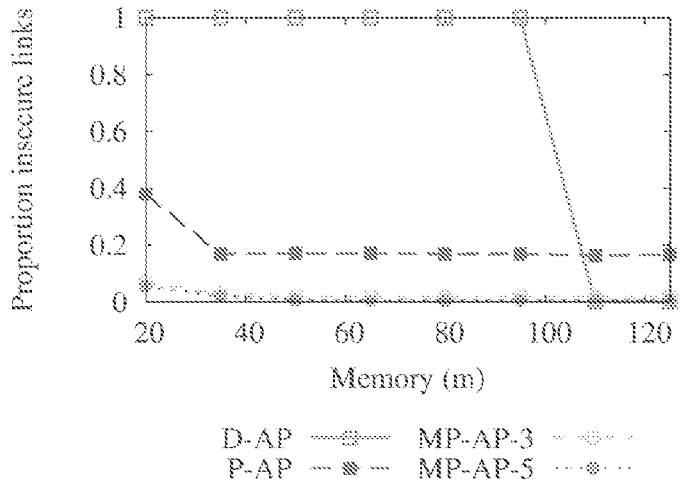

Fig. 8. Proportion of insecure links when varying available memory for representative all pairwise establishment protocols.

Figure 8 shows protocols under varying available memory to initialize nodes with secret information. Again we see the all or nothing security of D-AP, which requires at least memory equal to 100 secret keys to ensure all links are established securely which is due to the 10% compromised nodes in this scenario. The path and multi-path based protocols are capable of establishing many links securely despite very low amounts of memory. They increase resiliency as memory improves. The P-AP protocol is initialized with a grid-based logical topology which has 3-dimensions when memory is 20, but is 2-dimensions for the memory value of 35 and larger, so resiliency does not increase well when more memory is added beyond 35. In the MP-AP case, the random-based logical topology allows each additional memory to improve resiliency as more shortest disjoint paths are available. Although the increases are slight as memory increases, the expected resiliency does increase as more memory is added until the ideal situation occurs where all disjoint paths have only one intermediate node.

Key points. Given the various parameter settings the ascending ordering of protocols in terms of resiliency is D-AP, P-AP, and MP-AP. We additionally find that D-AP has a strict all or nothing trend while the path and multi-path based protocols are gradual in their decline in resiliency as either compromised nodes increases or available memory decreases. The path and multi-path based protocols come at the cost of communication which is not imposed by the direct protocol D-AP. Our next results capture this overhead.

6.2. Varied physical topology properties

We now investigate the affects that the physical topology characerics have. The number of nodes in the network has an effect on resiliency as larger networks must aim to establish more physical links which places more burden on the protocols. The more prominent effect of network characteristics is their impact on overhead as larger networks require more communication between nodes, and the density of the network affects this communication as well.

A:20

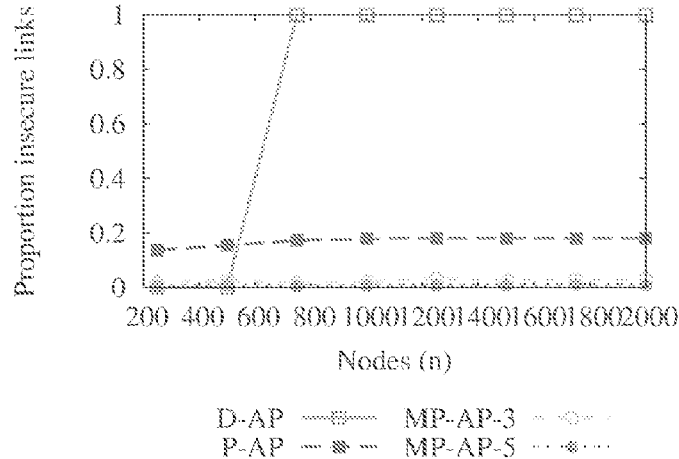

Fig. 9. Proportion of insecure links when varying number of nodes for representative all pairwise establishment protocols.

Figure 9 shows the security impact of network size. D-AP has the most noticeable change when the network size changes since the threshold where the adversary can compromise all links is dependent on the ratio of memory to number of nodes in the network is larger. The other protocols do have a dependence between their resilience and the ratio of memory to number of nodes, but it is less prominent here and they are capable of tolerating larger network sizes despite using the same amount of memory.

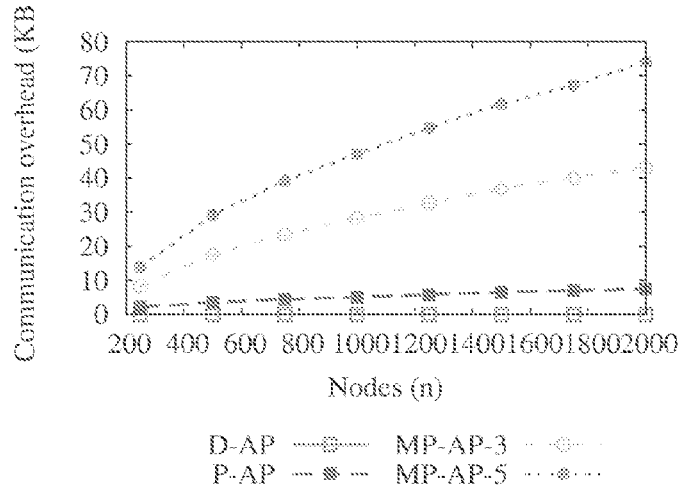

Fig. 10. Average communication overhead per node when varying number of nodes for representative all pairwise establishment protocols.

A:21

Figure 10 shows the overhead[1] of each protocol. The resiliency gains offered by MP-AP come at an increased communication cost since multiple paths must be used. Furthermore, the path found with P-AP will select intermediate nodes which have the fewest total physical hops, so the paths with MP-AP potentially find extremely poor intermediate nodes which are many physical hops away from the other nodes in the path. This difference in path selection enables MP-AP to be more resilient as an attacker cannot actively modify routing information to become part of the path.

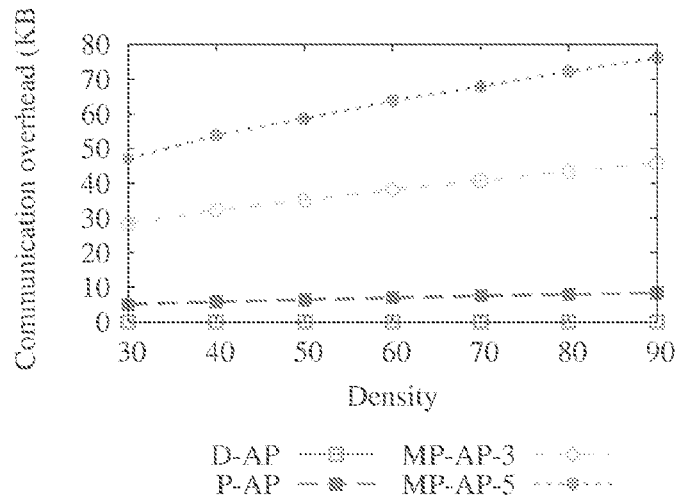

Fig. 11. Average communication overhead per node when varying density for representative all pairwise establishment protocols.

Figure 11 shows the affects of density on overhead. The density has two impacts in terms of communication. Firstly, as these protocols aim to establish all pairwise keys for physical links, the density directly increases the number of keys being established which requires communication for each key being established. Secondly, the higher the density the reduced average number of hops between two nodes which reduces overhead. Overall, the increased density will increase overhead, but you can see in the case of P-AP which can take more advantage of paths that are shorter this increase is less with respect to the increase in density. The MP-AP also leverage these shorter paths but not as significantly as P-AP since the logical intermediate nodes in MP-AP are fixed. This is observable as the relationship between communication overhead and density is less than linear, and this would be exactly linear if there was no benefit in terms of shorter paths in higher density networks.

Key points. We observed that the larger networks have lower resiliency since resilience in the key establishment protocols are dependent on the ratio of memory used to number of nodes in the network. The protocol P-AP has lower communication overhead than MP-AP due to both a single path being selected instead of multiple paths and also the optimized path selection of P-AP. Both of these factors also reduce the resiliency of P-AP, so overall MP-AP aims to be more resilient at a higher cost.

---

[1] D-AP has a small amount of overhead locally, but we ignore this overhead as it is negligible compared to performing multi-hop communication in the path and multipath based protocols.

A:22

6.3. All pairwise vs. connected graph establishment

We now focus on the comparing protocols that aim to establish all pairwise physical links and those that only establish just enough pairwise physical links to ensure a connected graph with high probability. The connected graph version of each protocol can improve in terms of communication and resiliency depending on how establishing fewer links affects the protocol.

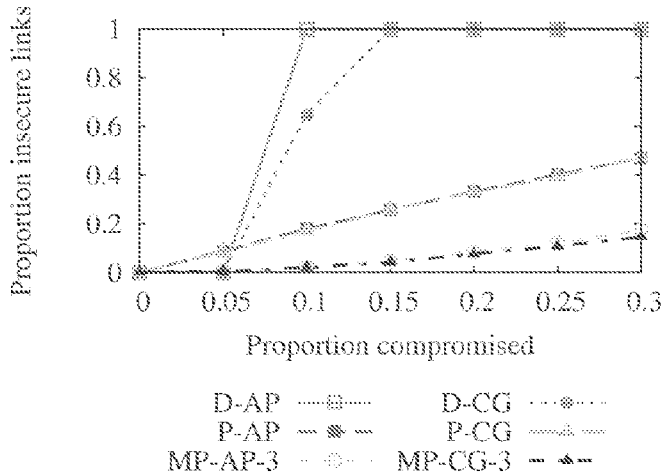

Fig. 12. Proportion insecure links when varying proportion compromised nodes for representative all pairwise (AP) and connected graph (CG) establishment protocols Figure 12 shows AP and CG versions for each protocol given varied proportions of compromised nodes. We first observe that between D-CG and D-AP, the D-CG can increase resiliency, but it still converges to all links being compromised quite quickly. We can see the relationship between these two protocols better when we vary density in our next scenarios. The path and multipath based protocols do not offer noticeable increases in resiliency in their connected graph versions versus the all pairwise versions. These protocols get their advantages in terms of communication overhead.

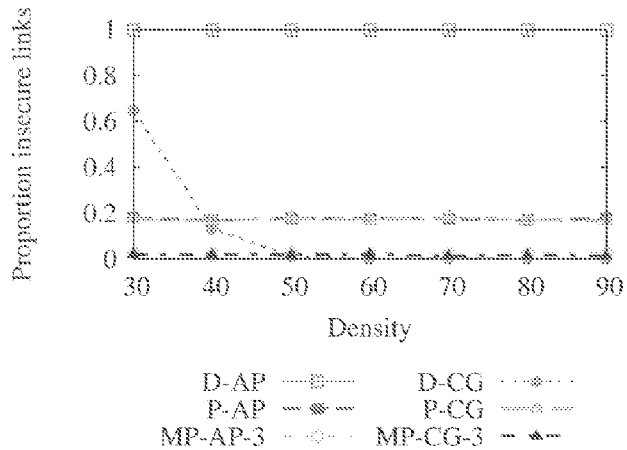

Fig. 13. Proportion insecure links when varying density for representative all pairwise (AP) and connected graph (CG) establishment protocols.

Figure 13 shows AP and CG versions given varied density. The varied density has significant impact on the CG protocols as it directly affects how many links must be established, that is, the higher density the fewer potential links must be established since each node has more chances to have a physical neighbor that it can share a key with. Again the path and multipath based protocols exhibit little difference in resiliency between the connected graph and all pairwise establishments. However, the difference between D-AP and D-CG is quite significant and shows the real advantages that the work [Du et al. 2005] proposing the ideas in D-CG was aiming to achieve. As density increases, the resiliency significantly increases as a larger pool of key spaces can be used as low probabilities of two nodes being able to establish a key are sufficient for a connected graph in these highly dense networks.

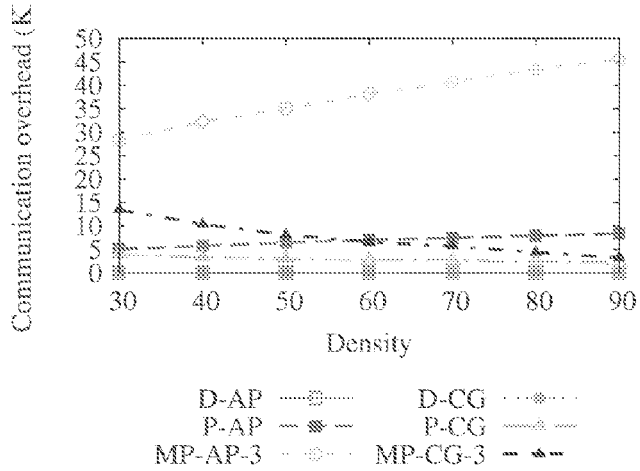

Fig. 14. Average communication overhead per node when varying density for representative all pairwise (AP) and connected graph (CG) establishment protocols.

Figure 14 shows the comparison in overhead as density changes. The path and multipath based protocols obtain their advantages when establishing connected graphs in terms of reduced overhead as density increases. As the density increases, the P-CG and MP-CG protocols establish the exact same number of links on average which is the minimum number of average links to ensure connectivity. The decreases we observe with these protocols comes from is due to better shortest paths on the physical topology as higher density ensures nodes are on average fewer hops from each other.

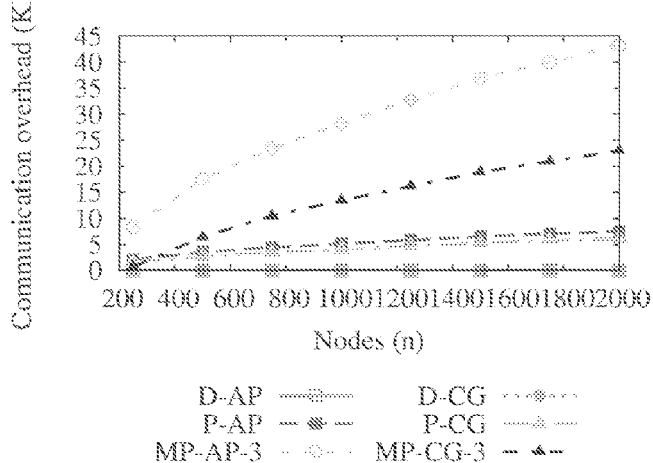

Fig. 15. Average communication overhead per node when varying number of nodes for representative all pairwise (AP) and connected graph (CG) establishment protocols.

Figure 15 shows overhead as the number of nodes in the network changes. As in the density case, we again observe reduced overhead in the protocols that ensure a connected graph when compared with their variants that ensure all pairwise physical links. The trends of both versions of these protocols still increases at a similar rate as nodes increase since the average path length between nodes increases as the network size increases.

Key points. For the direct protocols, D-AP and D-CG, the higher the physical density the greater resiliency in the D-CG protocol compared with D-AP. For the path and multipath protocols, P-AP, P-CG, MP-AP, and MP-CG, the P-CG and MP-CG gain advantages when physical density is high when compared with P-AP and MP-AP protocols.

6.4. Varied number of paths in MP-AP

We have shown our protocol compared with relevant existing work, and we now investigate the behavior of our protocol as you alter the number of paths being used for establishment. We focus on odd values as these are ideal for resilience which can be seen if you compare MP-AP-3 with MP-AP-4 since they both are broken when two paths are broken while the latter has a higher cost of four paths.

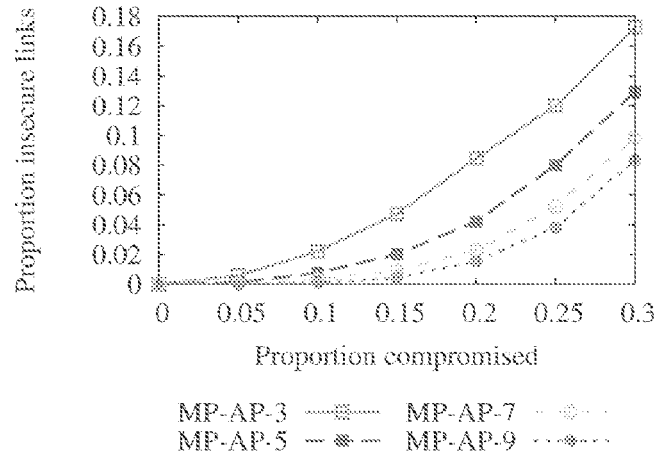

Fig. 16. Proportion insecure links when varying proportion compromised nodes for representative multipath based all pairwise establishment protocols.

Figure 16 reveals that more paths offers increased resiliency even as the number of compromised nodes increases. At the most extreme scenario, MP-AP-9 can ensure that half of the links become insecure when compared with MP-AP-3. The exact relationship between these schemes is non-trivial as there are two forces at work here when the number of paths changes. First, the more paths used for establishment will increase the average path-length of each path in the logical topology which actually reduces resilience of each path. Second, the more paths used for establishment will reduce the probability that an adversary controls a majority of paths. Thus, the relationship can be non-trivial and we investigate further how resilience is affected as various parameters of the network scenario change.

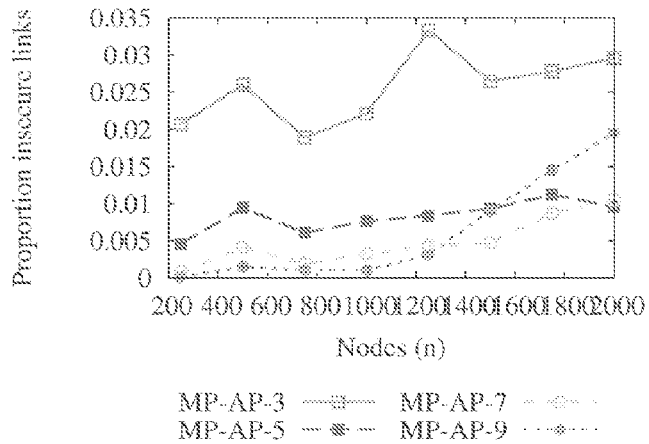

Fig. 17. Proportion insecure links when varying number of nodes for representative multi-path based all pairwise establishment protocols.

Figure 17 shows resilience when varying the number of paths for each scheme. Up until 1250 nodes, the trend is more paths the more resilient the protocol. However, this trend is broken in larger networks. The issue that arises with the protocols with more paths in larger networks is that the logical topology being constructed will offer fewer and fewer disjoint paths of small hop-length. Thus, when enough disjoint paths are sufficiently long the resilience drops significantly since just one intermediate logical node must be malicious to corrupt the entire path.

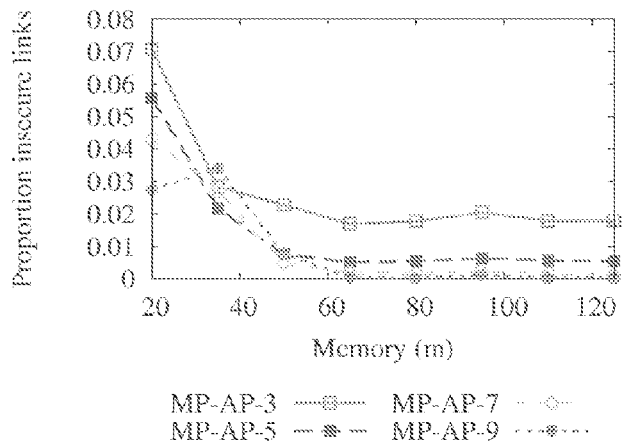

Fig. 18. Proportion insecure links when varying available memory for representative multi-path based all pairwise establishment protocols.

Figure 18 shows the affects of memory on security of the protocols. The memory directly affects the density used in the random logical topologies. Increasing density will ensure more, shorter disjoint paths which is what affects resilience. We observe strange behavior when memory is 35 at each node which is due to reasons mentioned above as the protocols with more paths happen to be less resilient since they are forced to use very long paths. At 65 memory and greater each protocol seems to converge to a stable state as nearly all node-disjoint paths used have only a single intermediate logical node.

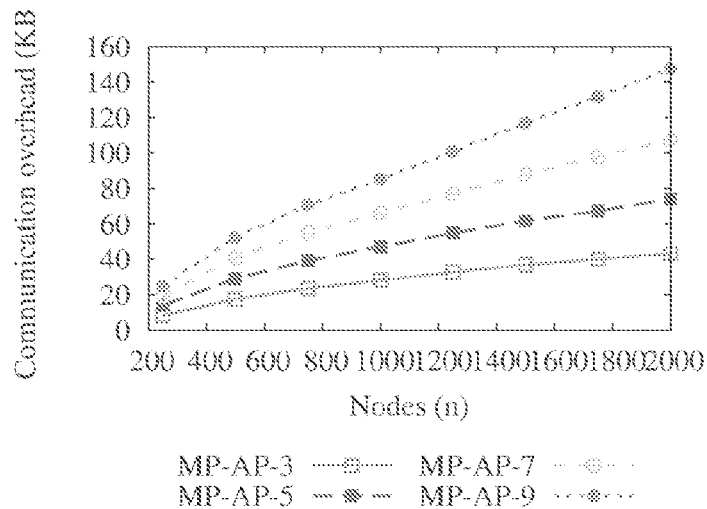

Fig. 19. Average communication overhead per node when varying number of nodes for representative multi-path based all pairwise establishment protocols.

Figure 19 shows the overhead imposed by utilizing more paths. This overhead is directly related to the number of paths being used as each path requires roughly the same overhead when averaged over numerous established links.

Key points. The resilience of MP-AP is generally improved with additional paths but also has an important dependence on both memory and network size since these affect the number of short disjoint paths offered by the randomly generated logical topologies. The greater resilience of using more paths comes at the obvious increase in communication overhead incurred.

7. RELATED WORK

We present related work in this section on sensor network key establishment work and error correction codes. To understand the efforts taken in key establishment within sensor networks, the prior survey work [Camtepe and Yener 2005] summarizes the area well. We will detail several works in this area and discuss how they relate to our work.

Direct key establishment. We detailed a general protocol D-AP based on an early work [Blom 1985] that ensures all pairwise nodes have an opportunity to attempt key establishment with low memory budgets, and as we have shown through our evaluations this technique can result in weak security. The D-AP scheme is optimal given its constraints, so a key work in the area relaxes these constraints to only establish enough keys to form a connected graph [Eschenauer and Gligor 2002]. The randomized techniques were fairly simply as each node had a key-ring which are a set of keys taken from a large key-pool, and these key-ring sizes determined security and connectivity properties. Other work [Di Pietro et al. 2003] improved upon this technique to better use the key-rings to improve security. The other direct protocol we detail D-CG is based on the work [Du et al. 2005] which further improves this technique by not using simplistic keys but utilizing several instances of the construction proposed in the work [Blom 1985], and such a protocol has higher resilience properties as well as more flexibility to tune whether the protocol should optimize for scenarios of little adversarial actions or try to tolerate more extreme scenarios wthat have high adversarial actions.

Path-based key establishment. We detailed a protocol P-AP which is to represent the protocol denoted PIKE from the work [Chan and Perrig 2005].

Leveraging deployment information. In our work we assume zero deployment information, that is, nodes are uniformly randomly dispersed in the physical environment. Prior work [Du et al. 2006] has shown improvements on existing key distribution schemes when some knowledge of the distribution is used when initializing secret information at nodes, and multipath key establishment could be enhanced as well by these techniques. The work [Du et al. 2006] enhances the techniques in the previous work [Du et al. 2005] to ensure keys spaces are more likely for nodes that will potentially be physically close. This physical closeness is deduced with deployment information, so the overall effect is that sufficient probability can be ensured with a much larger key pool which reduces the potential of an adversary.

Error correction codes. The network error correction code [?] solves in an expensive manner the same error correction problem we address. In [?], the maximum rate that the source can transmit secretly and securely is exactly computed. In particular, for all achievable rates, polynomial time encoding and decoding algorithms are provided. Our error correction technique achieves the same maximum rate in [?] but maintains a lower computational complexity and higher error correction probability. Our scheme is a extension of [?], which only considers error correction but not the secrecy of the messages.

8. CONCLUSION
REFERENCES

HP AND SHELL TEAM ON A MASSIVE WIRELESS SENSOR NETWORK FOR EXPLORATION. http://wsnblog.com/tag/hp/. (???).

Rolf Blom. 1985. An optimal class of symmetric key generation systems. In *Advances in Cryptology*. Springer, 335–338.

S.A. Camtepe and B. Yener. 2005. Key distribution mechanisms for wireless sensor networks: a survey. *Rensselaer Polytechnic Institute, Troy, New York, Technical Report* (2005), 05–07.

H. Chan and A. Perrig. 2005. PIKE: Peer intermediaries for key establishment in sensor networks. In *INFOCOM 2005. 24th Annual Joint Conference of the IEEE Computer and Communications Societies. Proceedings IEEE*, Vol. 1. IEEE, 524–535.

Roberto Di Pietro, Luigi V Mancini, and Alessandro Mei. 2003. Random key-assignment for secure wireless sensor networks. In *Proceedings of the 1st ACM workshop on Security of ad hoc and sensor networks*. ACM, 62–71.

Wenliang Du, Jing Deng, Yunghsiang S Han, and Pramod K Varshney. 2006. A key predistribution scheme for sensor networks using deployment knowledge. *Dependable and Secure Computing, IEEE Transactions on* 3, 1 (2006), 62–77.

Wenliang Du, Jing Deng, Yunghsiang S Han, Pramod K Varshney, Jonathan Katz, and Aram Khalili. 2005. A pairwise key predistribution scheme for wireless sensor networks. *ACM Transactions on Information and System Security (TISSEC)* 8, 2 (2005), 228–258.

Paul Erdős and Alfréd Rényi. 1960. On the evolution of random graphs. *Magyar Tud. Akad. Mat. Kutató Int. Közl* 5 (1960), 17–61.

Laurent Eschenauer and Virgil D Gligor. 2002. A key-management scheme for distributed sensor networks. In *Proceedings of the 9th ACM conference on Computer and communications security*. ACM, 41–47.

Shih-I Huang, Shiuhpyng Shieh, and SY Wu. 2005. Adaptive random key distribution schemes for wireless sensor networks. *Computer Security in the 21st Century* (2005), 91–105.

Alon Itai, Yehoshua Perl, and Yossi Shiloach. 2006. The complexity of finding maximum disjoint paths with length constraints. *Networks* 12, 3 (2006), 277–286.

C. Karlof and D. Wagner. 2003. Secure routing in wireless sensor networks: Attacks and countermeasures. *Ad hoc networks* 1, 2 (2003), 293–315.

The invention claimed is:

1. A network of computers with error correction code configured to transmit a key secretly and securely between a source node and a receiver node which do not a priori share a key, so as to establish a shared key between the source node and the receiver node, the network of computers comprising:
   a first computer-based workstation operating as the source node and configured to encode the key into a plurality of distinct encoded source files, encoding being operatively implemented in one of: a) hardware, b) software, or c) a combination of hardware and software;
   a plurality of computer-based workstations operating as a plurality of intermediate nodes and configured to each receive a distinct encoded source file of the plurality of distinct encoded source files and transmit, to the receiver node, the distinct encoded source file when requested by the receiver; and
   a second computer-based workstation operating as the receiver node and configured to decode the plurality of distinct encoded source files and retrieve the key to establish the shared key, decoding being operatively implemented in one of: a) hardware, b) software, or c) a combination of hardware and software;
   wherein the encoding of the key comprises the following steps:
      generating the key to be transmitted from the source node to the receiver node,
      generating one or more random packets independently and uniformly within the source node, and
      generating a distinct encoded file of the plurality of distinct encoded files for each intermediate node in the network, the distinct encoded file comprising a linear combination of the key, the one or more random packets that were independently and uniformly generated and corresponding error detection information.

2. The network of computers of claim 1, wherein an intermediate node of the plurality of intermediate nodes and corresponding intermediate transmission links that link the particular intermediate node to the source node and to the receiver node form a two-hop path between the source node and the receiver node.

3. The network of computers of claim 1, wherein the encoded source files comprise linearly independent combinations of the following:
   one or more randomly generated packets, and
   a source message, the source message comprising a set or subset of keys and corresponding error detection information.

4. The network of computers of claim 3, wherein the error detection information comprises hash information from each of the other encoded files, the hash information being defined in terms of random parameters generated by the source node.

5. The network of computers of claim 1, wherein the network is a distributed wireless network.

6. A network of computers with error correction code configured to transmit a key pool secretly and securely comprising:
   (i) a plurality of computer-based workstations operating as a plurality of intermediate nodes and configured to each:
      receive one or more, but not all, individual keys of the key pool, the key pool comprising a plurality of individual keys,
      encode independently from other nodes of the plurality of intermediate nodes, using network error correction codes, the one or more individual keys, wherein the encoded one or more individual keys are represented by a vector that contains random linear combinations of the one or more individual keys, encoding being operatively implemented in one of: a) hardware, b) software, or c) a combination of hardware and software, and
      transmit the encoded one or more individual keys to a receiver node, when requested; and
   (ii) a computer-based workstation operating as the receiver node and configured to decode encoded one or more individual keys received from a subset of the intermediate nodes, using a decoding algorithm to retrieve a specified subset of the key pool, decoding being operatively implemented in one of: a) hardware, b) software, or c) a combination of hardware and software;
   wherein decoding of the encoded keys to retrieve the key pool in the receiver node comprises the following steps:
      identifying two or more distinct groupings of intermediate nodes of the plurality of nodes, wherein each intermediate node within a particular distinct grouping of intermediate nodes shares a same set of individual keys of the key pool,
      requesting each of the intermediate nodes of the two or more distinct groupings of intermediate nodes to forward their respective encoded vectors,
      using error detection information to identify a number of compromised nodes within the two or more distinct grouping of intermediate nodes,
      decoding each of the encoded vectors forwarded by each of the intermediate nodes,
      determining a number of consistent decoded keys forwarded by the intermediate nodes within a particular grouping of the two or more distinct groupings of intermediate nodes, the number of consistent decoded keys is based on the number of compromised nodes, and
      extracting the key pool by retrieving an error-free subset of the key pool from each of two or more distinct grouping of intermediate nodes.

* * * * *